United States Patent
Sonnino et al.

(10) Patent No.: US 10,599,320 B2
(45) Date of Patent: Mar. 24, 2020

(54) INK ANCHORING

(71) Applicant: Microsoft Technology Licensing, LLC, Redmond, WA (US)

(72) Inventors: Eduardo Sonnino, Vancouver (CA); Anthony Dart, Redmond, WA (US); Ryan Chandler Pendlay, Bellevue, WA (US); March Rogers, Bothell, WA (US); Jason Hartman, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/638,058

(22) Filed: Jun. 29, 2017

(65) Prior Publication Data
US 2018/0329596 A1 Nov. 15, 2018

Related U.S. Application Data

(60) Provisional application No. 62/506,519, filed on May 15, 2017.

(51) Int. Cl.
*G06F 3/048* (2013.01)
*G06F 3/0486* (2013.01)
(Continued)

(52) U.S. Cl.
CPC ............ *G06F 3/0486* (2013.01); *G06F 3/03* (2013.01); *G06F 3/0416* (2013.01);
(Continued)

(58) Field of Classification Search
CPC ........ G06F 3/0486; G06F 3/03; G06F 3/0416; G06F 3/0487; G06F 3/04883;
(Continued)

(56) References Cited

U.S. PATENT DOCUMENTS

| 5,539,427 A | 7/1996 | Bricklin et al. |
| 6,493,006 B1 | 12/2002 | Gourdol et al. |

(Continued)

FOREIGN PATENT DOCUMENTS

| EP | 1174801 A2 | 1/2002 |
| WO | 2004063862 A2 | 7/2004 |

(Continued)

OTHER PUBLICATIONS

"SmartLife PUSH Journal", http://www.smartlifepushjournal.com/, Retrieved on: May 9, 2017, 18 pages.

(Continued)

*Primary Examiner* — Anil N Kumar
(74) *Attorney, Agent, or Firm* — Talem IP Law, LLP

(57) ABSTRACT

Techniques for ink anchoring are described. In one or more implementations, an interactive canvas is displayed on one or more display devices of a computing device. An ink object is generated by digitizing ink input received to the interactive canvas. In response to determining that the ink object overlaps an object in the interactive canvas, the ink object is anchored to the object such that a spatial relationship between the ink object and the object is maintained if the ink object or the object is manipulated.

20 Claims, 14 Drawing Sheets

(51) Int. Cl.

| | |
|---|---|
| *G06F 3/0488* | (2013.01) |
| *G06F 3/041* | (2006.01) |
| *G06F 3/0487* | (2013.01) |
| *G06K 9/00* | (2006.01) |
| *G06F 3/03* | (2006.01) |
| *G06F 17/24* | (2006.01) |
| *G06F 3/0484* | (2013.01) |
| *G06F 3/0481* | (2013.01) |

(52) U.S. Cl.
CPC .......... *G06F 3/0484* (2013.01); *G06F 3/0487* (2013.01); *G06F 3/04845* (2013.01); *G06F 3/04883* (2013.01); *G06F 17/24* (2013.01); *G06F 17/242* (2013.01); *G06K 9/00409* (2013.01); *G06F 3/0481* (2013.01)

(58) Field of Classification Search
CPC ...... G06F 3/0481; G06F 17/242; G06F 17/24; G06K 9/00409
See application file for complete search history.

(56) References Cited

U.S. PATENT DOCUMENTS

| | | |
|---|---|---|
| 6,559,869 B1 | 5/2003 | Lui et al. |
| 6,683,600 B1 | 1/2004 | Lui |
| 6,687,876 B1 | 2/2004 | Schilit et al. |
| 7,036,077 B2 | 4/2006 | Saund et al. |
| 7,185,280 B2 | 2/2007 | Deganello et al. |
| 7,237,202 B2 | 6/2007 | Gage |
| 7,259,752 B1 | 8/2007 | Simmons |
| 7,324,691 B2 | 1/2008 | Li et al. |
| 7,373,590 B2 | 5/2008 | Woolf et al. |
| 7,581,194 B2 | 8/2009 | Iwema et al. |
| 7,748,634 B1 | 7/2010 | Zehr et al. |
| 8,014,607 B2 | 9/2011 | Saund et al. |
| 8,116,570 B2 | 2/2012 | Vukosavljevic et al. |
| 8,250,463 B2 | 8/2012 | Bargeron et al. |
| 8,347,206 B2 | 1/2013 | Gear et al. |
| 8,429,568 B2 | 4/2013 | Davidson |
| 8,451,238 B2 | 5/2013 | Kim et al. |
| 8,464,167 B2 | 6/2013 | Saund et al. |
| 8,464,175 B2 | 6/2013 | Turcan et al. |
| 8,484,027 B1 | 7/2013 | Murphy |
| 8,806,382 B2 | 8/2014 | Matsuda |
| 8,880,597 B1 | 11/2014 | Pachikov et al. |
| 9,015,610 B2 | 4/2015 | Hunter |
| 9,053,553 B2 | 6/2015 | Popović et al. |
| 9,075,522 B2 | 7/2015 | Hinckley et al. |
| 9,292,171 B2 | 3/2016 | Li et al. |
| 9,298,855 B2 | 3/2016 | Aggarwal et al. |
| 9,400,570 B2 | 7/2016 | Chang |
| 9,990,107 B2 | 6/2018 | Butcher et al. |
| 10,345,953 B2 | 7/2019 | Knepper et al. |
| 2001/0037719 A1 | 11/2001 | Gardner et al. |
| 2006/0001656 A1 | 1/2006 | Laviola, Jr. et al. |
| 2006/0036945 A1 | 2/2006 | Radtke et al. |
| 2006/0080616 A1 | 4/2006 | Vogel et al. |
| 2006/0085767 A1 | 4/2006 | Hinckley et al. |
| 2006/0224952 A1 | 10/2006 | Lin |
| 2006/0242559 A1 | 10/2006 | Krantz et al. |
| 2006/0267967 A1 | 11/2006 | Hinckley et al. |
| 2007/0079260 A1 | 4/2007 | Bhogal et al. |
| 2007/0115264 A1 | 5/2007 | Yu et al. |
| 2007/0136662 A1 | 6/2007 | Khaba |
| 2007/0180377 A1 | 8/2007 | Gittelman et al. |
| 2007/0214407 A1* | 9/2007 | Bargeron .............. G06F 17/242 715/205 |
| 2008/0232690 A1 | 9/2008 | Saund et al. |
| 2008/0238887 A1 | 10/2008 | Love |
| 2009/0235158 A1 | 9/2009 | Rosenstein et al. |
| 2010/0122162 A1 | 5/2010 | Terada et al. |
| 2010/0138756 A1 | 6/2010 | Saund et al. |
| 2010/0141605 A1 | 6/2010 | Kang et al. |
| 2010/0171754 A1* | 7/2010 | Hatfield ................ G06F 17/242 345/619 |
| 2010/0318916 A1 | 12/2010 | Wilkins |
| 2011/0072344 A1 | 3/2011 | Harris et al. |
| 2011/0102314 A1 | 5/2011 | Roux |
| 2011/0157225 A1 | 6/2011 | Cheon et al. |
| 2011/0187662 A1 | 8/2011 | Lee et al. |
| 2011/0209057 A1 | 8/2011 | Hinckley et al. |
| 2011/0209102 A1 | 8/2011 | Hinckley et al. |
| 2011/0242026 A1 | 10/2011 | Ishigaki |
| 2011/0267353 A1 | 11/2011 | Johansson |
| 2012/0066581 A1 | 3/2012 | Spalink |
| 2012/0096345 A1 | 4/2012 | Ho et al. |
| 2012/0113019 A1 | 5/2012 | Anderson |
| 2012/0162115 A1 | 6/2012 | Lim |
| 2012/0176416 A1 | 7/2012 | Dondurur et al. |
| 2012/0221659 A1 | 8/2012 | Brown et al. |
| 2012/0304084 A1 | 11/2012 | Kim et al. |
| 2013/0021379 A1 | 1/2013 | Sirpal et al. |
| 2013/0073998 A1 | 3/2013 | Migos et al. |
| 2013/0222265 A1 | 8/2013 | Smith et al. |
| 2013/0239049 A1 | 9/2013 | Perrodin et al. |
| 2013/0254655 A1 | 9/2013 | Nykyforov |
| 2013/0268848 A1 | 10/2013 | Pena et al. |
| 2013/0300674 A1 | 11/2013 | Davidson |
| 2014/0002379 A1 | 1/2014 | Hsieh et al. |
| 2014/0033027 A1 | 1/2014 | Polo et al. |
| 2014/0033124 A1 | 1/2014 | Sorrick |
| 2014/0047308 A1 | 2/2014 | Chub et al. |
| 2014/0063174 A1 | 3/2014 | Junuzovic et al. |
| 2014/0137039 A1 | 5/2014 | Kroeger et al. |
| 2014/0157125 A1 | 6/2014 | Seo |
| 2014/0173173 A1 | 6/2014 | Battu et al. |
| 2014/0181711 A1 | 6/2014 | Wu |
| 2014/0189593 A1 | 7/2014 | Kurita et al. |
| 2014/0204014 A1 | 7/2014 | Thom |
| 2014/0215341 A1 | 7/2014 | Fratti et al. |
| 2014/0215365 A1 | 7/2014 | Hiraga et al. |
| 2014/0298223 A1 | 10/2014 | Duong et al. |
| 2014/0337720 A1 | 11/2014 | Park et al. |
| 2015/0026618 A1* | 1/2015 | Stone .................... G06F 3/0486 715/769 |
| 2015/0067593 A1 | 3/2015 | Henerlau et al. |
| 2015/0089389 A1 | 3/2015 | Cohen-zur et al. |
| 2015/0121179 A1 | 4/2015 | Saund et al. |
| 2015/0145800 A1 | 5/2015 | Fukui |
| 2015/0309704 A1 | 10/2015 | Bae et al. |
| 2015/0338939 A1 | 11/2015 | Vong |
| 2015/0339050 A1 | 11/2015 | Vong |
| 2016/0004301 A1 | 1/2016 | Stachniak et al. |
| 2016/0048318 A1 | 2/2016 | Markiewicz |
| 2016/0334986 A1 | 11/2016 | Cheon et al. |
| 2016/0357367 A1 | 12/2016 | Foster et al. |
| 2016/0378291 A1 | 12/2016 | Pokrzywka |
| 2017/0045996 A1 | 2/2017 | Ka et al. |
| 2017/0046024 A1 | 2/2017 | Dascola et al. |
| 2017/0060819 A1 | 3/2017 | Rucine et al. |
| 2017/0285932 A1 | 10/2017 | Hastings et al. |
| 2017/0329580 A1 | 11/2017 | Jann et al. |
| 2018/0095653 A1 | 4/2018 | Hasek |
| 2018/0232069 A1 | 8/2018 | Krishnakumar et al. |

FOREIGN PATENT DOCUMENTS

| | | |
|---|---|---|
| WO | 2014110462 A1 | 7/2014 |
| WO | 2016035097 A2 | 3/2016 |
| WO | 2016037017 A1 | 3/2016 |

OTHER PUBLICATIONS

"Anchored objects", https://helpx.adobe.com/indesign/using/anchored-objects.html, Mar. 17, 2017, 19 pages.

"Displaying Contextual Tabs", https://web.archive.org/web/20120110123757/https://msdn.microsoft.com/en-us/library/windows/desktop/ee264329(v=vs.85).aspx, Jan. 10, 2012, 4 pages.

"Arrange, Resize, Rotate, and Align", http://www.pixelmator.com/ios/user-guide/arrange.php, Retrieved on: May 10, 2017, 5 pages.

(56) References Cited

OTHER PUBLICATIONS

"SMART Notebook Training", http://northweststate.edu/wp-content/uploads/files/nb11_beginner.pdf, Retrieved on: May 10, 2017, 69 pages.
"Exari DocGen", https://www.exari.com/contract-management-products-and-solutions/document-assembly/, Mar. 12, 2017, 8 pages.
Chen,"Navigation Techniques for Dual-Display E-Book Readers", Proceedings of the SIGCHI Conference on Human Factors in Computing Systems, Apr. 5, 2008, 10 pages.
Da"People and Object Tracking for Video Annotation", In Doctoral dissertation of Faculty of Science and Technology, Sep. 2012, 102 pages.
Golovchinsky,"Moving Markup: Repositioning Freeform Annotations", In Proceedings of the 15th annual ACM symposium on User interface software and technology, Oct. 27, 2002, 9 pages.
Hinckley,"Pen + Touch=New Tools", In Proceedings of 23rd Annual ACM Symposium on User Interface Software and Technology, Oct. 3, 2010, pp. 27-36.
Houser,"Google Awarded Patent for Dual-Page Ebook Reader", https://www.gazelle.com/thehorn/2014/02/11/google-awarded-patent-for-dual-page-ebook-reader/, Feb. 11, 2014, 5 pages.
Li,"Dedicated E-reading Devices: the State of the Art and the Challenges", In Journal of Design of Electronic Text, vol. 1, Aug. 5, 2008, 7 pages.
Miclaus,"Semantic Web Based Context-Adaptable Generation of Product Specific Documentation", In Proceedings of the 5th International Workshop on Web of Things, Oct. 8, 2014, 6 pages.
Moran,"Pen-Based Interaction Techniques for Organizing Material on an Electronic Whiteboard", UIST '97 Proceedings of the 10th annual ACM symposium on User interface software and technology, Oct. 1997, 10 pages.
Nielsen,"Utilize Available Screen Space", https://www.nngroup.com/articles/utilize-available-screen-space/, May 9, 2011, 5 pages.
Ostermann,"ScribMaster for Android", https://www.scribmaster.com/en/;jsessionid=77A63AA57E38885641E53B78F78E1BFC, 2012, 3 pages.
"Non Final Office Action Issued in U.S. Appl. No. 15/636,164", dated Nov. 16, 2018, 38 Pages.
"Non-Final Office Action Issued in U.S. Appl. No. 15/636,402", dated Oct. 1, 2018, 16 Pages.
"Non Final Office Action Issued in U.S. Appl. No. 15/637,759", dated Aug. 6, 2018, 31 Pages.
Linder, Brad, "Hands on With MSI's Dual Touchscreen Netbook Prototype", Retrieved from https://liliputing.com/2010/01/hands-on-with-msis-dual-touchscreen-netbook-prototype.html, Jan. 7, 2010, 10 Pages.
"International Search Report and Written Opinion Issued in PCT Application No. PCT/US18/027399", dated Jul. 5, 2018, 12 Pages.
"International Search Report and Written Opinion Issued in PCT Application No. PCT/US18/027400", dated Jul. 5, 2018, 11 Pages.
"International Search Report and Written Opinion Issued in PCT Application No. PCT/US18/027401", dated Jul. 10, 2018, 11 Pages.
"International Search Report and Written Opinion Issued in PCT Application No. PCT/US18/027412", dated Jul. 11, 2018, 12 Pages.
"International Search Report and Written Opinion Issued in PCT Application No. PCT/US18/027694", dated Jul. 11, 2018, 11 Pages.
"International Search Report and Written Opinion Issued in PCT Application No. PCT/US18/027695", dated Jul. 16, 2018, 11 Pages.
"Invitation to Pay Additional Fees Issued in U.S. Appl. No. PCT/US18/028730", dated Jun. 21, 2018, 12 Pages.
"International Search Report and Written Opinion Issued in PCT Application No. PCT/US2018/027411", dated Jun. 19, 2018, 11 Pages.
"International Search Report & Written Opinion Issued in PCT Application No. PCT/US2018/028730", dated Aug. 29, 2018, 18 Pages.
Valentak, Zoran, "5 Sidebar Tab Extensions for Chrome", Retrieved From http://www.ilovefreesoftware.com/14/featured/sidebar-tab-extensions-for-chrome.html, Oct. 14, 2015, 6 Pages.
"Final Office Action Issued in U.S. Appl. No. 15/637,759", dated Feb. 21, 2019, 33 Pages.
"Non Final Office Action in U.S. Appl. No. 15/638,067", dated Mar. 19, 2019, 13 Pages.
"Final Office Action Issued in U.S. Appl. No. 15/636,402", dated Apr. 18, 2019, 16 Pages.
"Non Final Office Action Issued in U.S. Appl. No. 15/638,101", dated Apr. 24, 2019, 17 Pages.
"Non Final Office Action Issued in U.S. Appl. No. 15/638,122", dated May 2, 2019, 18 Pages.
"Final Office Action Issued in U.S. Appl. No. 15/636,164", dated Jun. 7, 2019, 31 Pages.
"OneMinute VideoTutorials—Snap Object to the Face of Another Object in Blender 2.7", Retrieved from: https://www.youtube.com/watch?v=a_TIY7QyeV8, May 17, 2014, 3 Pages.
"Non-Final Office Action Issued in U.S. Appl. No. 15/636,402", dated Oct. 4, 2019, 27 Pages.
"Final Office Action Issued in U.S. Appl. No. 15/638,067", dated Oct. 9, 2019, 17 Pages.
"Non-Final Office Action Issued in U.S. Appl. No. 15/640,215", dated Sep. 18, 2019, 14 Pages.
"Final Office Action Issued in U.S. Appl. No. 15/638,101", dated Nov. 4, 2019, 19 Pages.
"Final Office Action Issued in U.S. Appl. No. 15/638,122", dated Nov. 5, 2019, 16 Pages.
"Non Final Office Action Issued in U.S. Appl. No. 15/637,759", dated Dec. 11, 2019, 27 Pages.

* cited by examiner

INK ANCHORING

RELATED APPLICATION

This application claims priority to U.S. Provisional Application No. 62/506,519, filed May 15, 2017, entitled "Ink Anchoring", the disclosure of which is hereby incorporated by reference herein in its entirety.

BACKGROUND

Increasingly, users provide input to touch display devices using a stylus. In some creative applications, such as a journal application or a drawing application, users may draw on the display device using a stylus in order to generate an ink object that is intended to be associated with an object. For example, a user may annotate a picture by writing on or proximate the picture. As another example, the user may draw a line between multiple objects in order to show a relationship between the multiple objects. In conventional solutions, user input intended to manipulate an object that is associated with an ink object causes only the object to be modified thereby destroying the intended relationship between the ink object and the one or more objects.

SUMMARY

Techniques for ink anchoring are described. In one or more implementations, an interactive canvas is displayed on one or more display devices of a computing device. An ink object is generated by digitizing ink input received to the interactive canvas. In response to determining that the ink object overlaps an object in the interactive canvas, the ink object is anchored to the object such that a spatial relationship between the ink object and the object is maintained if the ink object or the object is manipulated.

In one or more implementations, an interactive canvas is displayed on one or more display devices of a computing device. An ink object is generated by digitizing ink input received to the interactive canvas. In response to determining that the ink object overlaps multiple objects in the interactive canvas, anchor points on the ink object that are aligned with a corresponding anchor position within each of the multiple objects are determined. Next, the anchor points are anchored on the ink object to the respective anchor positions within each of the multiple objects. In response to at least one of the multiple objects being manipulated, the ink object is adjusted to maintain the alignment of the anchor points with the corresponding anchor positions within the multiple objects.

In one or more implementations, an interactive canvas is displayed on one or more display devices of a computing device. An ink object is generated by digitizing ink input received to the interactive canvas. In response to determining that the ink object overlaps three or more objects in the interactive canvas, anchor points on the ink object are determined. The anchor points are aligned with a corresponding anchor position within each of the three or more objects. Next, the anchor points on the ink object are anchored to the respective anchor positions within each of the three or more objects. The object is then divided into multiple segments such that each of the multiple segments overlaps two of the three or more objects. In response to at least one of the three or more objects being manipulated, a respective one of the multiple segments of the ink object which overlaps the manipulated object is adjusted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
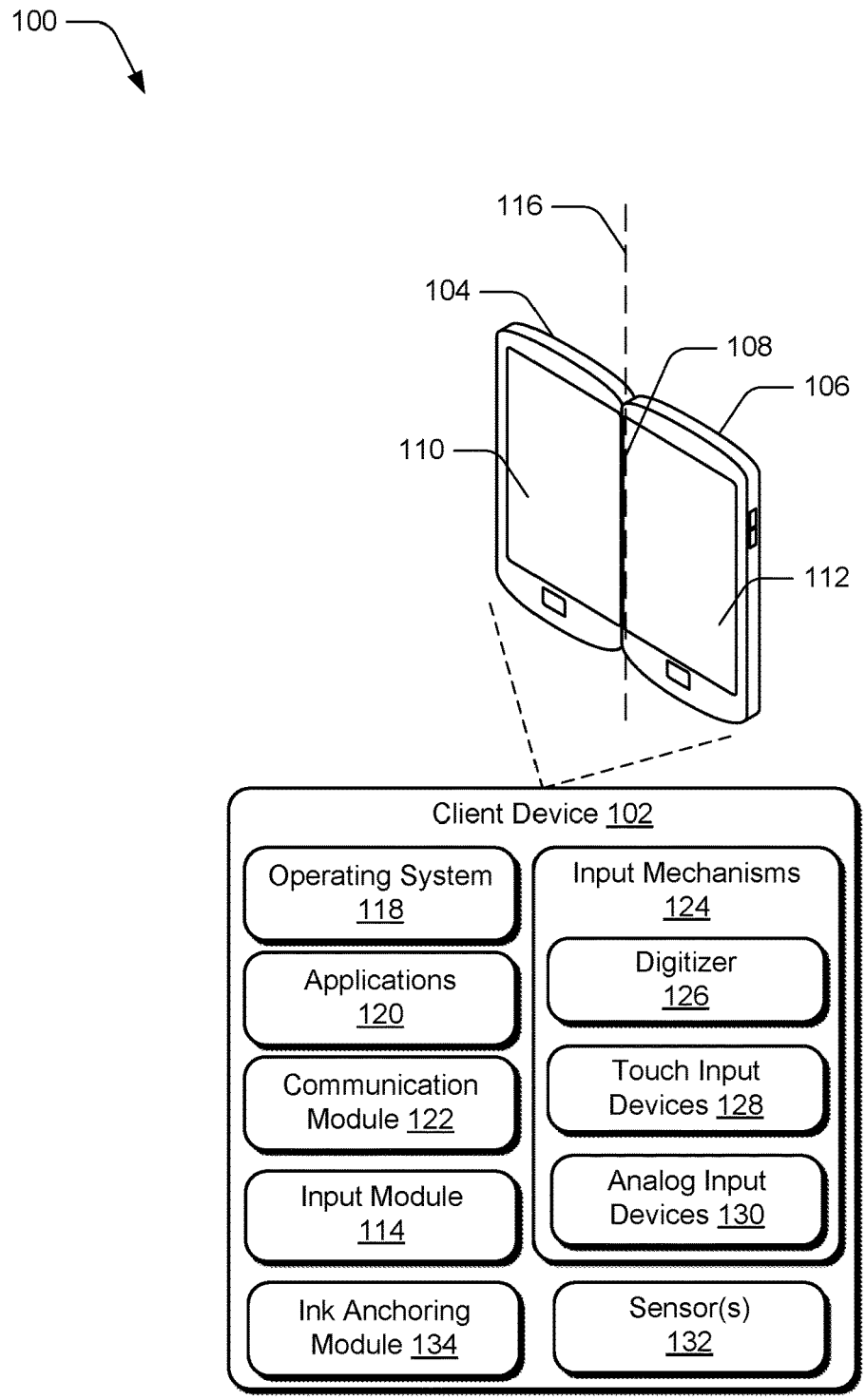
FIG. 1 is an illustration of an environment in an example implementation that is operable to support techniques for ink anchoring discussed herein.

Techniques for ink anchoring are described. Generally, the techniques described herein anchor an ink object corresponding to ink input that is received in "free form" to one or more objects that the ink object overlaps or intersects such that a spatial relationship between the ink object and the object is maintained if the ink object or the object is manipulated, such as by moving or re-sizing the object. The anchoring causes the ink object and the object to be maintained as separate objects by creating a "non-destructive link" between the ink object and the object, such that the object is not permanently edited by the overlapping ink object.

In one or more implementations, the ink anchoring techniques are configured to anchor an ink object to multiple objects that the ink object overlaps or intersects. Notably, as the number of objects that are intersected by the ink object increases, the complexity of representing and maintaining the relationship between the ink object and the multiple objects increases. Thus, for each object, an anchor point on the ink object that is aligned with an anchor position (e.g., an x,y position) within the object is determined. Subsequently, when one or more of the objects is manipulated, the ink object is adjusted in order to maintain the alignment of the anchor points with each respective anchor position within the objects. For example, to adjust the ink object, a geometric transform can be applied to the ink object in order to deform the ink object such that the anchor points are aligned with the corresponding anchor positions.

In one or more implementations, the ink anchoring techniques discussed throughout can be applied to scenarios in which the ink object overlaps three or more objects. In this scenario, the ink object is divided into multiple segments such that each segment overlaps two of the three or more objects. For example, if the ink object overlaps a first, second, and third object, the ink object can be divided into a first segment of the ink object which overlaps the first and second objects, and a second segment of the ink object that overlaps the second and third objects. In this scenario, if the third object is moved, then the second segment between the second and third objects can be adjusted or deformed a greater amount than the adjustment of the first segment which is less affected by movement of the third object.

Thus, the described techniques reduce user frustration which often occurs in conventional solutions when user input intended to manipulate an object that is associated with an ink object, causes only the object to be modified thereby destroying the intended relationship between the ink object and the one or more objects. In addition, the ink anchoring techniques improve the user experience by reducing the number of steps required to link an ink object with one or more objects. For example, unlike conventional solutions, the user does not need to select both the ink object and the one or more objects, and then initiate a grouping command in order to link the ink object with the one or more objects object. Instead, the ink object is automatically anchored to the one or more objects in response to detecting an overlap, or a close proximity, between the ink object and the one or more objects which is indicative of user intent to anchor the ink object to the one or more objects.

FIG. 1 is an illustration of an environment 100 in an example implementation that is operable to employ techniques for ink anchoring discussed herein. Environment 100 includes a client device 102 which can be configured for mobile use, such as a mobile phone, a tablet computer, a wearable device, a handheld gaming device, a media player, and so on. In this example, the client device 102 is implemented as a "dual-display" device, and includes a display device 104 and a display device 106 that are connected to one another by a hinge 108. The display device 104 includes a touch surface 110, and the display device 106 includes a touch surface 112. The client device 102 also includes an input module 114 configured to process input received via one of the touch surfaces 110, 112 and/or via the hinge 108. While some of the techniques discussed herein will be described with reference to a dual-display device, it is to be appreciated that in some cases the techniques may also be implemented on a single-screen device, such as a mobile phone, tablet computer, media player, laptop computer, desktop computer, and so forth. In addition, the hinge 108 may allow the display devices 104 and 106 to fold back on each other to provide a "single display" device. As such, the techniques described herein may be designed to function whether the user is operating in a two-display mode or a single-display mode. In addition, while the dual display device is illustrated with a hinge in this example, it is to be appreciated that in some cases the techniques may be implemented in single display, dual-display, or multi-display devices without the hinge.

The hinge 108 is configured to rotationally move about a longitudinal axis 116 of the hinge 108 to allow an angle between the display devices 104, 106 to change. In this way, the hinge 108 allows the display devices 104, 106 to be connected to one another yet be oriented at different angles and/or planar orientations relative to each other. In at least some implementations, the touch surfaces 110, 112 may represent different portions of a single integrated and continuous display surface that can be bent along the hinge 108.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 10.

The client device 102 includes a variety of different functionalities that enable various activities and tasks to be performed. For instance, the client device 102 includes an operating system 118, applications 120, and a communication module 122. Generally, the operating system 118 is representative of functionality for abstracting various system components of the client device 102, such as hardware, kernel-level modules and services, and so forth. The operating system 118, for instance, can abstract various components (e.g., hardware, software, and firmware) of the client device 102 to enable interaction between the components and applications running on the client device 102.

The applications 120 are representative of functionality for performing different tasks via the client device 102. In one particular implementation, the applications 120 represent a web browser, web platform, or other application that can be leveraged to browse websites over a network.

The communication module 122 is representative of functionality for enabling the client device 102 to communicate over wired and/or wireless connections. For instance, the communication module 122 represents hardware and logic for communicating data via a variety of different wired and/or wireless technologies and protocols.

According to various implementations, the display devices 104, 106 generally represent functionality for visual output for the client device 102. Additionally, the display devices 104, 106 represent functionality for receiving various types of input, such as touch input, stylus input, touchless proximity input, and so forth via one or more of the touch surfaces 110, 112, which can be used as visual output portions of the display devices 104, 106. The input module 114 is representative of functionality to enable the client device 102 to receive input (e.g., via input mechanisms 124) and to process and route the input in various ways.

The input mechanisms 124 generally represent different functionalities for receiving input to the client device 102, and include a digitizer 126, touch input devices 128, and analog input devices 130. Examples of the input mechanisms 124 include gesture-sensitive sensors and devices (e.g., such as touch-based sensors), a stylus, a touch pad, accelerometers, a microphone with accompanying voice recognition software, and so forth. The input mechanisms 124 may be separate or integral with the display devices 104, 106; integral examples include gesture-sensitive displays with integrated touch-sensitive sensors.

The digitizer 126 represents functionality for converting various types of input to the display devices 104, 106, the touch input devices 128, and the analog input devices 130 into digital data that can be used by the client device 102 in various ways. The analog input devices 130 represent hardware mechanisms (e.g., the hinge 108) that are usable to generate different physical quantities that represent data. For instance, the hinge 108 represents a mechanism that can be leveraged to generate input data by measurement of a physical variable, such as hinge angle of the hinge 108. One or more sensors 132, for example, can measure the hinge angle, and the digitizer 126 can convert such measurements into digital data usable by the client device 102 to perform operations to content displayed via the display devices 104, 106.

Generally, the sensors 132 represent functionality for detecting different input signals received by the client device 102. For example, the sensors 132 can include one or more hinge sensors configured to detect a hinge angle between the display devices 104, 106. Additionally, the sensors 132 can include grip sensors, such as touch sensors, configured to detect how a user is holding the client device 102. Accordingly, a variety of different sensors 132 can be implemented to detect various different types of digital and/or analog input. These and other aspects are discussed in further detail below.

In one particular implementation, the applications 120 represent a journal application which provides an interactive canvas representative of pages of a journal. For example, a first page of the journal application can be presented on touch surface 110 of display device 104 while a second page of the journal application is presented on touch surface 112 of display device 106. The user can then write and draw on the interactive canvas, as well as insert and/or manipulate various different objects.

In at least some implementations, the applications 120 include or otherwise make use of an ink anchoring module 134. The ink anchoring module 134, for example, represents a standalone application. In other implementations, the ink anchoring module 134 is included as part of another application or system software, such as the operating system 118. Generally, the ink anchoring module 134 is configured to anchor ink input that is received in "free form" (e.g., writing or drawing on a touch surface of a device using a stylus) to one or more objects that the ink objects overlaps or intersects such that a spatial relationship between the ink object and the object is maintained if the ink object or the object is manipulated, such as by moving or re-sizing the object. In one or more implementations, the ink anchoring module 134 is configured to anchor an ink object to multiple objects that the ink object overlaps or intersects. In this scenario, when one or more of the objects is manipulated, the ink anchoring module 134 adjusts the ink object in order to maintain an alignment of anchor points on the ink object with respective anchor positions within the objects. Further discussion of this and other features is provided below.

Figure 2:
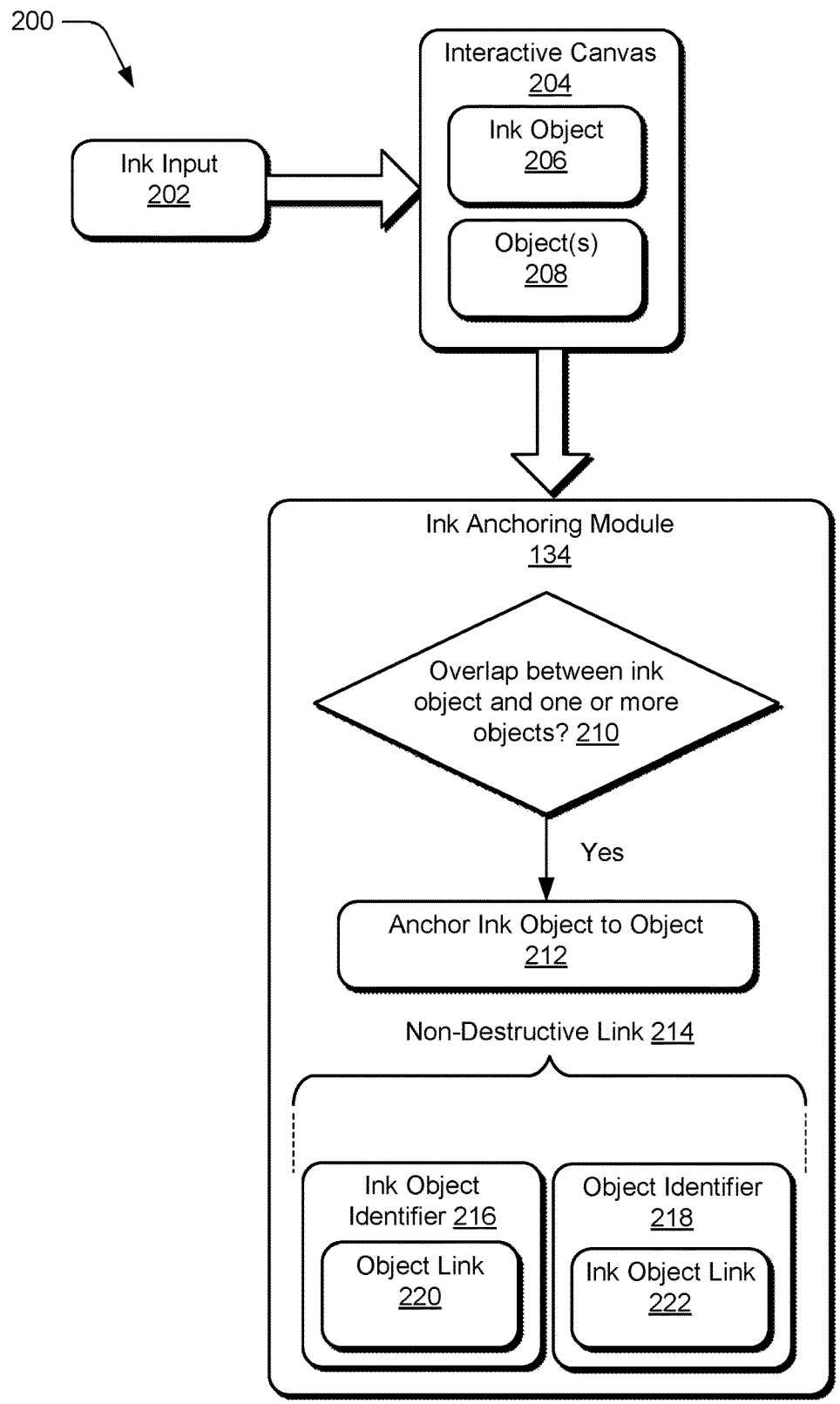
FIG. 2 illustrates a system showing the ink anchoring module of FIG. 1 in more detail.

FIG. 2 illustrates a system 200 showing the ink anchoring module 134 in more detail.

In this example, ink anchoring module 134 monitors ink input 202 to an interactive canvas 204. For example, a user can provide ink input 202 to an interactive canvas 204 by writing or drawing on the interactive canvas using a stylus or the user's finger. Thus, ink input 202 encompasses any type of input that can be provided to the interactive canvas using a stylus or the user's finger, including drawings strokes, drawing shapes, drawing lines, drawing pictures, writing, and so forth. The digitizer 126 creates an ink object 206 by digitizing and displaying a representation of the ink input 202 on the interactive canvas 204. The interactive canvas 204 may also include one or more objects 208. As described herein, objects may include any type of content, such as images and photos, videos, audio files, text, symbols, drawings, and so forth.

At 210, ink anchoring module 134 determines whether the ink object 206 overlaps one or more objects 208 displayed on the interactive canvas 204. Generally, the ink anchoring module 134 determines that the ink object 206 overlaps an object 208 if at least a portion of the ink object 206 at least partially overlaps or intersects the object 208.

If an overlap is detected, then at 212 the ink anchoring module 134 anchors the ink object 206 to the object 208 such that the spatial relationship between the ink object 206 and the object 208 is maintained if either the ink object or object are manipulated. In some cases, the ink anchoring module 134 may anchor the ink object to the object if the ink object 206 is within close spatial proximity to the object 208 without actually overlapping the ink object 206. The ink anchoring module 134 may also factor in a time proximity between the ink object and the object in order to determine an overlap. For example, if an object is inserted into the interactive canvas 204, and shortly thereafter the ink object is drawn within a close spatial proximity to the object, the time proximity between inserting the object 208 and creating the ink object 206 combined with the close spatial proximity between the objects, may cause the ink anchoring module 134 to anchor the ink object 206 to the object 208.

Figure 3A:
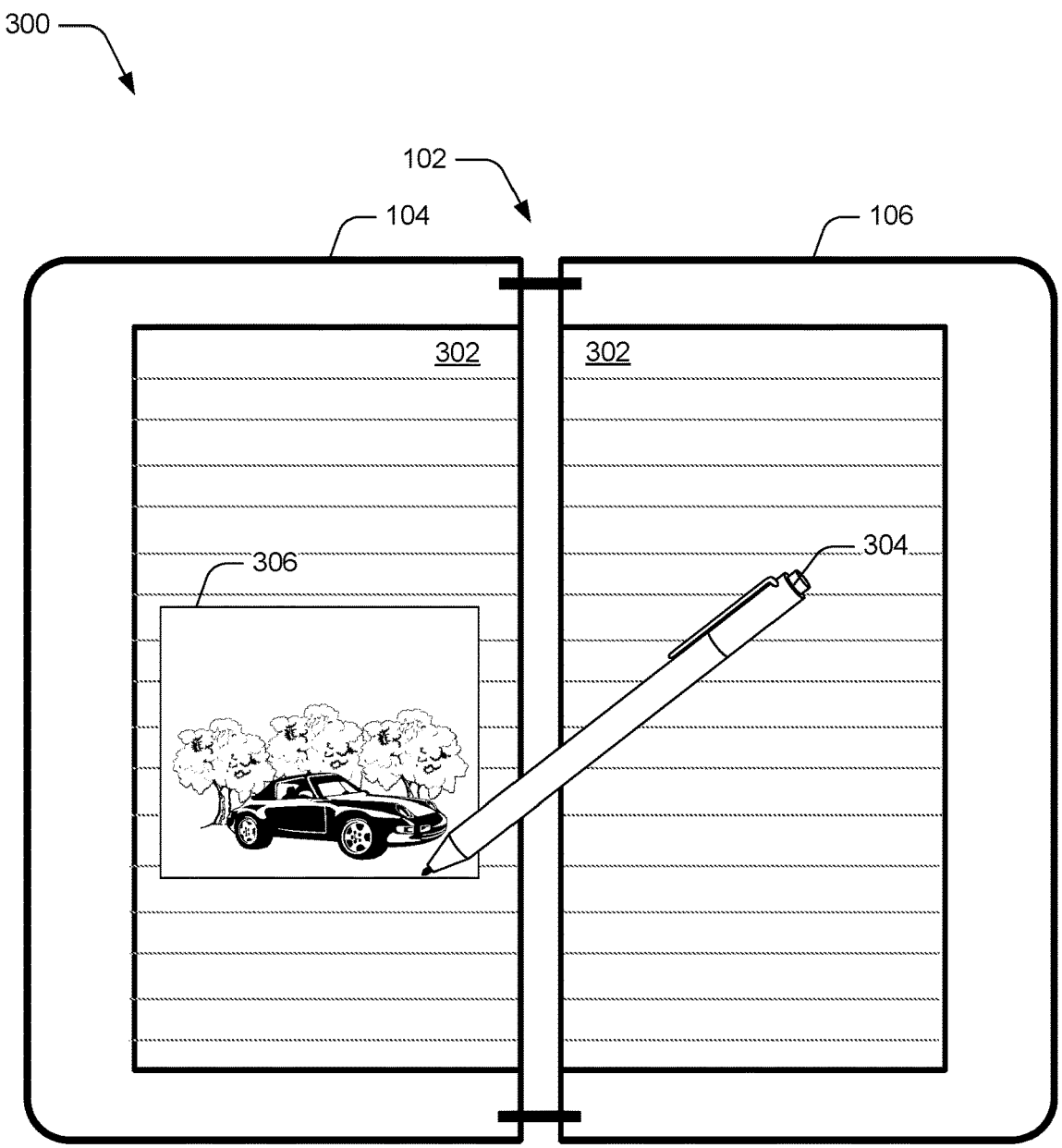
FIGS. 3A-3C illustrate various examples of ink anchoring in accordance with one or more implementations.
Figure 3B:
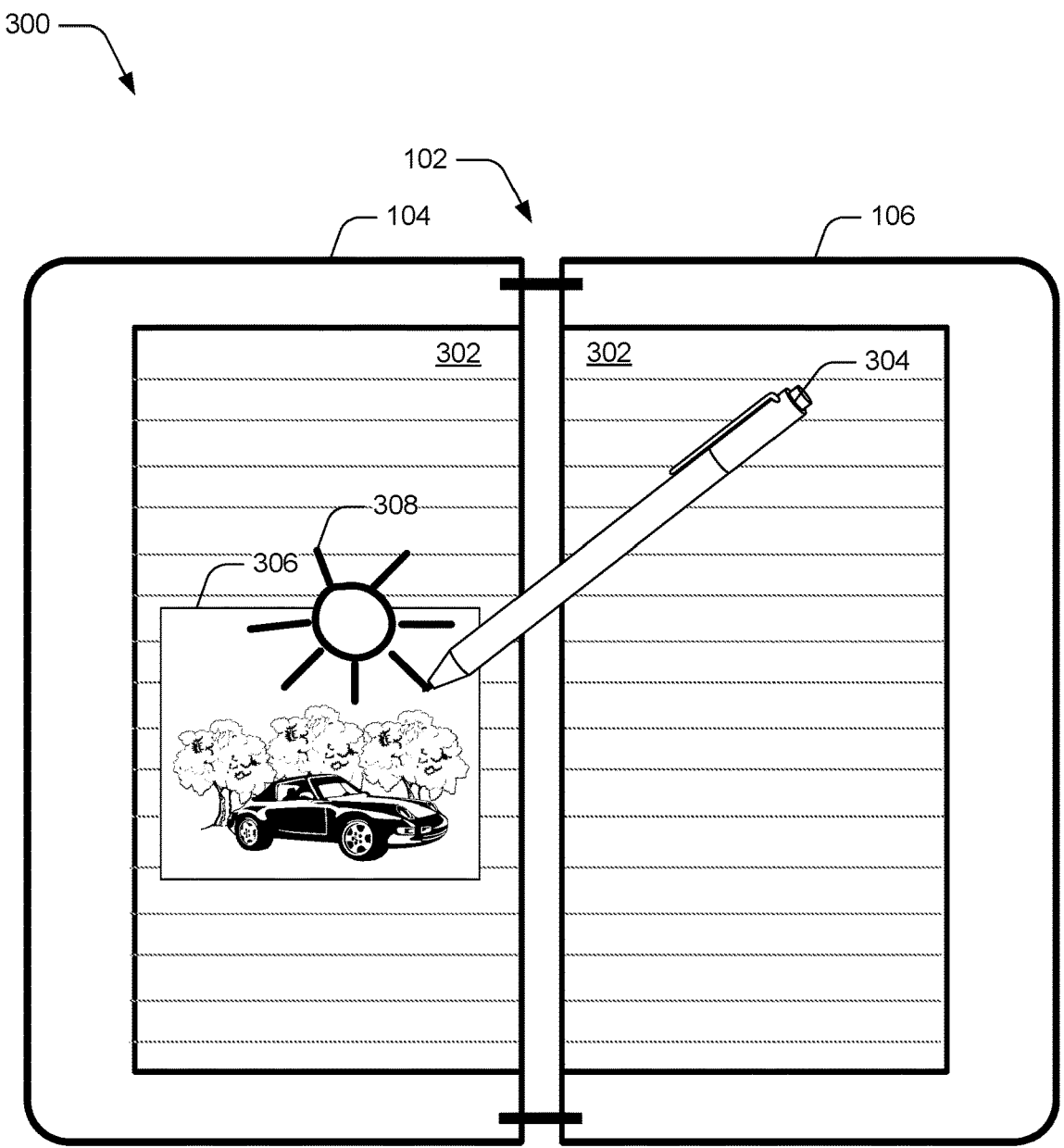
Figure 3C:
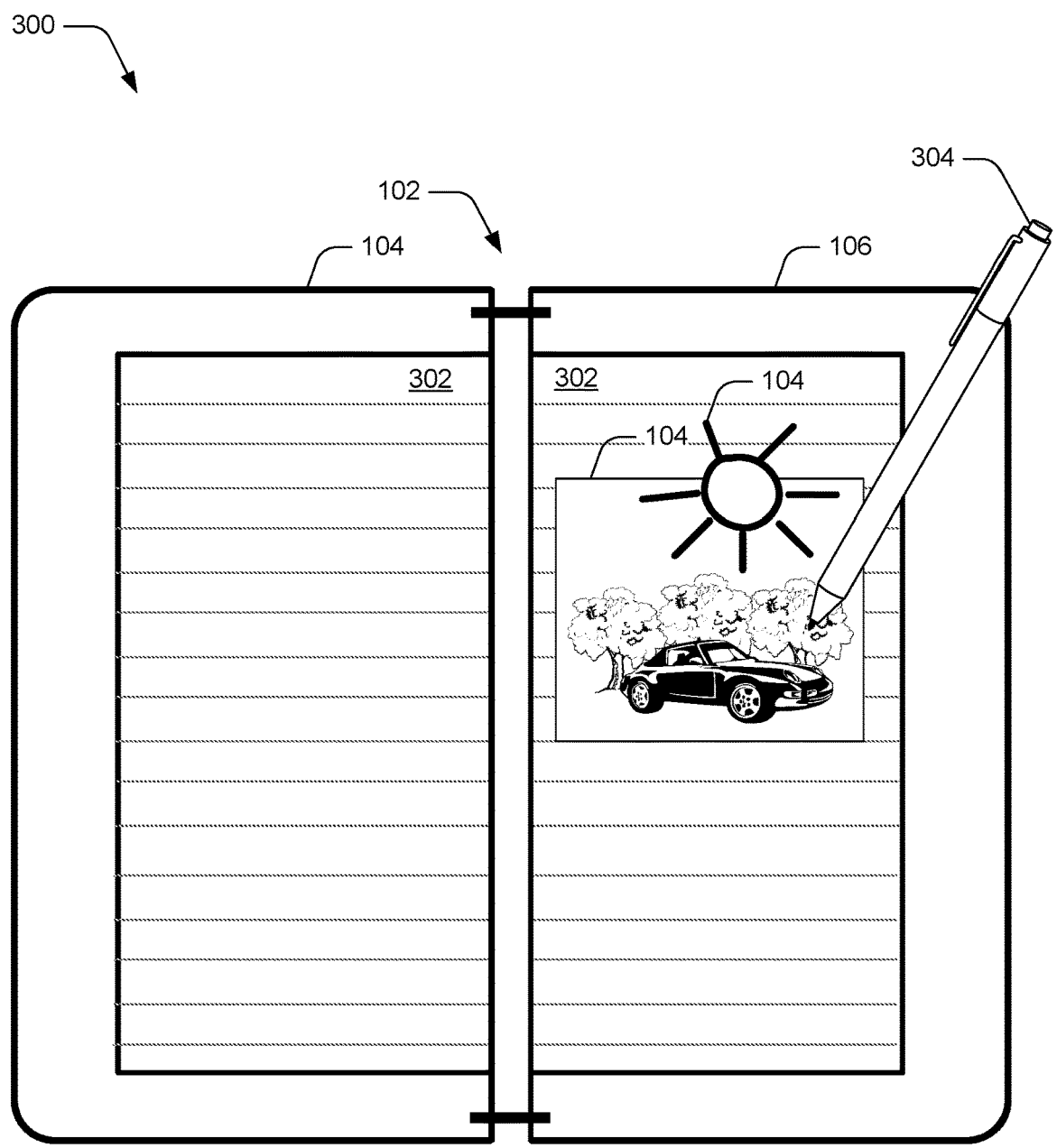

Consider, for example, FIGS. 3A to 3C which illustrate an example 300 of ink anchoring in accordance with one or more implementations.

In FIG. 3A, client device 102 displays an interactive canvas 302 on one or more displays. In this example, the interactive canvas 302 is presented on display devices 104 and 106 of a "dual-display" client device 102, and is associated with a journal application. However, as described throughout, in other cases the interactive canvas 302 may be presented on a "single-display" device and/or associated with a different type of application. The journal application enables the user to take notes and/or draw on the interactive canvas 302 using an input device, such as a stylus 304.

In this example, the interactive canvas 302 includes an object 306, which corresponds to a picture of a car. As described herein, objects may include any type of content, such as images and photos, videos, audio files, text, symbols, drawings, and so forth.

Referring now to FIG. 3B, ink input is provided to interactive canvas 302 when the user draws a picture of the sun on stylus 304. The ink input is digitized and displayed on the interactive canvas 302 as an ink object 308. In this case, ink anchoring module 134 determines that the ink object 308 overlaps the object 306, and thus anchors the ink object 308 to the object 306 such that the spatial relationship between the ink object 308 and the object 306 is maintained if either the ink object or object are manipulated, such as by moving or resizing the ink object or object.

For example, in FIG. 3C, the user has moved object 306 to the upper right hand corner of interactive canvas 302 displayed on display device 106. To do so, the user has selected object 306 using stylus 304, and dragged the object 306 to the upper right corner of interactive canvas 302. Notably, the user manipulation to move object 306 also causes the ink anchoring module 134 to maintain the spatial relationship between the objects by moving ink object 308 with the object 306.

Referring back to FIG. 2, in one or more implementations anchoring the ink object to the object creates a non-destructive link 214 between the ink object 206 and the object 208 such that the object is not permanently edited by the overlapping ink object 206. In fact, the user can remove the non-destructive link 214 at any time. In one or more implementations, the anchoring module 134 creates the non-destructive link 214 by maintaining separate object identifiers for each of the ink object 206 and the object 208. The separate object identifiers enable the ink object and the object to be accessed or searched for separately. For example, in FIG. 2, the non-destructive link is illustrated as including an ink object identifier 216 which identifies the ink object 206, and an object identifier 218 which identifies the object 208. The object identifiers each include a references to each other. For example, ink object identifier 216 is illustrated as including an object link 220 which links to the object, and object identifier 218 is illustrated as including an ink object link 222 which links to the ink object. Thus, the links 220 and 222 enable the ink object 206 and object 208 to be treated as a single entity, while the separate identifiers 216 and 218 maintain independence between the objects.

In one or more implementations, the ink anchoring module 134 is configured to anchor an ink object to multiple objects that the ink object overlaps or intersects. In this scenario, when one or more of the objects is manipulated, the ink anchoring module 134 adjusts the ink object in order to maintain an alignment of anchor points on the ink object with respective anchor positions within the objects.

Figure 4:
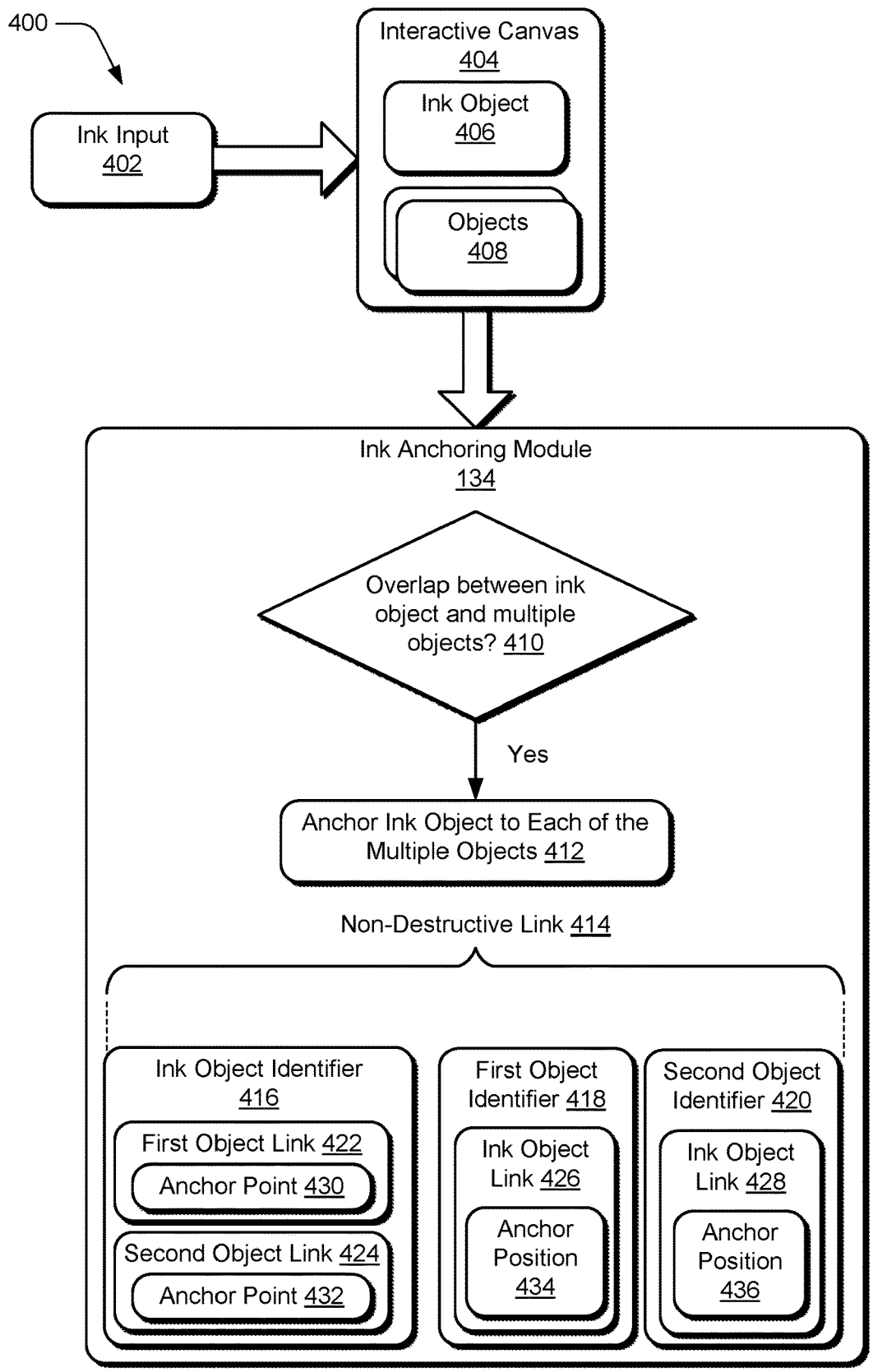
FIG. 4 illustrates a system in which the ink anchoring module 134 is configured to anchor an ink object to multiple objects.

Consider, for example, FIG. 4 which illustrates a system 400 in which the ink anchoring module 134 is configured to anchor an ink object to multiple objects. In this example, ink anchoring module 134 monitors ink input 402 to an interactive canvas 404. For example, a user can provide ink input 402 to an interactive canvas 404 by writing or drawing on the interactive canvas using a stylus or the user's finger. Thus, ink input 402 encompasses any type of input that can be provided to the interactive canvas using a stylus or the user's finger, including drawings strokes, drawing shapes, drawing lines, drawing pictures, writing, and so forth. The digitizer 126 creates an ink object 406 by digitizing and displaying a representation of the ink input 402 on the interactive canvas 404. The interactive canvas 404 may also include one or more objects 408.

At 410, ink anchoring module 134 determines whether the ink object 406 overlaps multiple objects 408 on the interactive canvas 404. Generally, the ink anchoring module 134 determines that the ink object 406 overlaps multiple objects if the ink object 406 overlaps or intersects two or more objects. However, as discussed above, an overlap or intersect may also be determined by the ink anchoring module 134 based on a spatial and/or time proximity between the ink object and the multiple objects.

If an overlap of multiple objects is detected, then at 412 the ink anchoring module 134 anchors the ink object 406 to each of the multiple objects. To do so, the ink anchoring module determines anchor points on the ink object 406 that are aligned with corresponding anchor positions within the multiple objects 408. Subsequently, when one or more of the objects is manipulated, the ink anchoring module 134 adjusts the ink object 406 in order to maintain an alignment of anchor points on the ink object 406 with respective anchor positions within the objects 308.

Figure 5A:
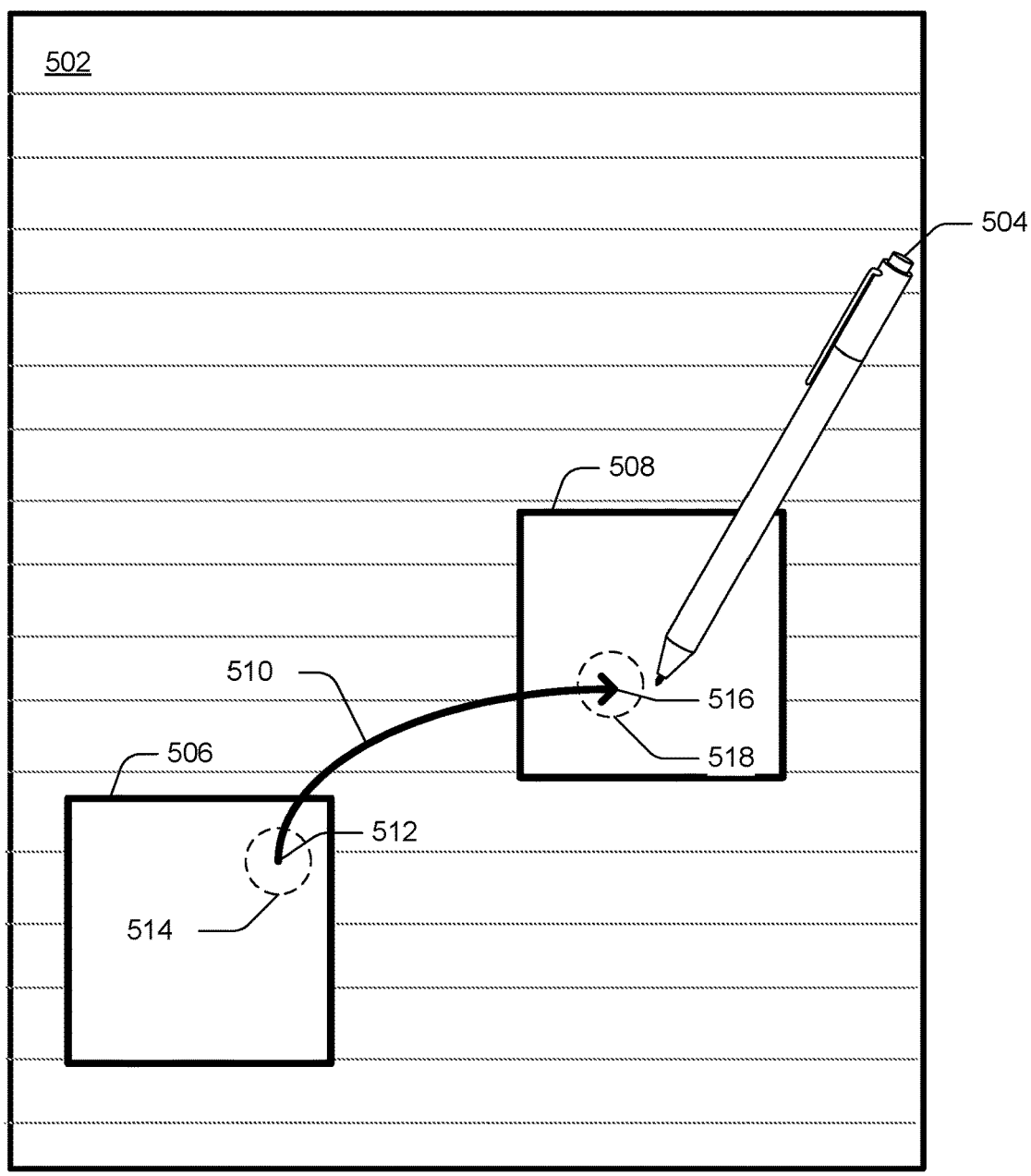
FIGS. 5A and 5B illustrate an example of ink anchoring for multiple objects in accordance with one or more implementations.
Figure 5B:
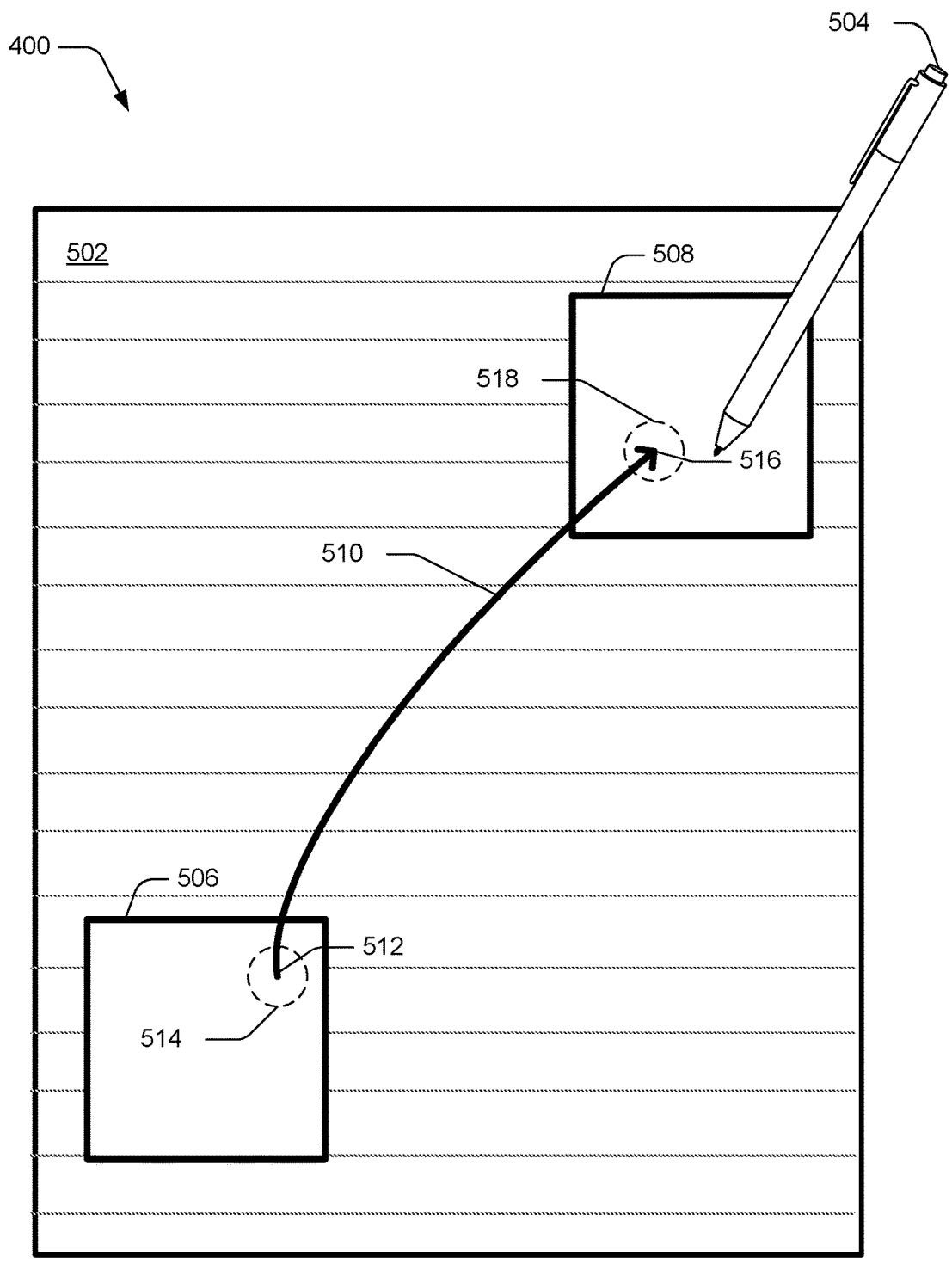

As an example, consider FIGS. 5A and 5B, which illustrate an example 500 of ink anchoring for multiple objects in accordance with one or more implementations. In FIG. 5A, client device 102 displays an interactive canvas 502 on one or more displays. As described throughout, the interactive canvas 502 may be associated with a journal application and presented on display devices 104 and 106 of a "dual-display" client device 102. However, in other cases the interactive canvas 502 may be presented on a "single-display" device and/or associated with a different type of application. The journal application enables the user to take notes and/or draw on the interactive canvas 502 using an input device, such as a stylus 504.

In this example, the interactive canvas 502 includes a first object 506 and a second object 508. As described throughout, objects may include any type of content, such as images and photos, videos, audio files, text, symbols, drawings, and so forth. Ink input is provided to interactive canvas 502 when the user draws a line with an arrow from the first object 506 to the second object 508. The ink input is digitized and displayed on the interactive canvas 502 as an ink object 510. In this case, ink anchoring module 134 determines that the ink object 510 overlaps both the first object 506 and the second object 508. The ink anchoring module 134 then determines a first anchor point 512 on the ink object 510 that is aligned with a first anchor position 514 on the first object 506. Similarly, the ink anchoring module 134 determines a second anchor point 516 on the ink object 510 that is aligned with a second anchor position 518 on the second object 508. The ink anchoring module 134 can determine the anchor points in a variety of different ways, such as based on the a beginning or ending drawing stroke, the amount of ink within the object, and so forth.

Ink anchoring module 134 then anchors the first anchor point 512 on the ink object 510 to the first anchor position 514 within the first object 506 and anchors the second anchor point 516 on the ink object 510 to the second anchor position 518 within the second object 508. Subsequently, in response to the first object 506 or the second object 508 being manipulated, the ink anchoring module 134 adjusts the ink object 510 to maintain the alignment of the first and second anchor points 512 and 516 with the first and second anchor positions 514 and 516, respectively.

For example, in FIG. 5B the user has manipulated second object 508 by moving the second object 508 to the upper right hand corner of interactive canvas 502. To do so, the user has selected object 508 using stylus 504, and dragged the second object 508 to the upper right corner of interactive canvas 502. In response to the manipulation of object 508, ink anchoring module 134 adjusts the ink object 510 in order to maintain the alignment of the first and second anchor points 512 and 516 on ink object 510 with the corresponding first and second anchor positions 514 and 518 within objects 506 and 508, respectively. For example, as depicted in FIG. 5B, the ink anchoring module 134 has deformed the shape of the ink object 510 in order to maintain the alignment of anchor points 512 and 516 with anchor positions 514 and 518.

Referring back to FIG. 4, in one or more implementations anchoring the ink object 406 to the multiple object 408 creates a non-destructive link 414 between the ink object 406 and the multiple objects 408 such that the multiple objects 408 are not permanently edited by the overlapping ink object 406. In fact, the user can remove the non-destructive link 414 at any time. In one or more implementations, the anchoring module 134 creates the non-destructive link 414 by maintaining separate object identifiers for each of the ink object 406 and each of the multiple objects 408. The separate object identifiers enable the ink object and each of the multiple objects to be accessed or searched for separately.

For example, in FIG. 4, the non-destructive link is illustrated as including an ink object identifier 416 which identifies the ink object 406, a first object identifier 418 which identifies a first object 408, and a second object identifier 420 which identifies a second object 408. Of course, if more than two objects are intersected by the ink object, additional object identifiers are created. The ink object identifier 416 provides default positioning information about the ink object 406 which can be understood by different types of applications and/or devices. This improves compatibility with different applications and devices which do not understand the ink anchoring scheme.

The object identifiers each include a references to each other. For example, ink object ID 416 is illustrated as including a first object link 422 and a second object link 424 which links to the first and second objects 408, respectively. Similarly, first object identifier 418 and second object identifier 420 include ink object links 426 and 428, respectively, which link to the ink object 406. Thus, the links 422, 424, 426, and 428 enable the ink object 406 and multiple objects 408 to be treated as a single entity, while the separate identifiers 416, 418, and 420 maintain independence between the ink object 406 and each object 408.

In addition, ink anchoring module 134 associates anchor points 430 and 432 of the ink object 406 with the ink object identifier 416, and associates anchor positions 434 and 436 (e.g., x,y position information) with the object identifiers 418 and 420, respectively. Thus, when one or more of the objects is manipulated, the ink anchoring module 134 looks up the object identifiers, and adjusts the ink object 406 in order to maintain an alignment of the anchor points 430 and 432 on the ink object 406 with respective anchor positions 434 and 436. For example, the ink anchoring module 134 changes the default positioning information of the ink object in order to align the anchor points with the x,y anchor positions within the objects. In one or more implementations, the ink anchoring module 134 adjusts the ink object 406 by applying a geometric transform to the ink object 406 in order to align the first and second anchor points with the corresponding first and second anchor positions.

In one or more implementations, the ink anchoring techniques discussed throughout can be applied to scenarios in which the ink object overlaps three or more objects. In this scenario, the ink anchoring module 134 divides the ink object into segments, where each segment overlaps two of the three or more objects. For example, if the ink object overlaps a first, second, and third object, the ink anchoring module can divide the ink object into a first segment of the ink object which overlaps the first and second objects, and a second segment of the ink object that overlaps the second and third objects. In this scenario, if the third object is moved, then the second segment between the second and third objects can be adjusted or deformed a greater amount than the adjustment of the first segment which is less affected by movement of the third object.

Figure 6A:
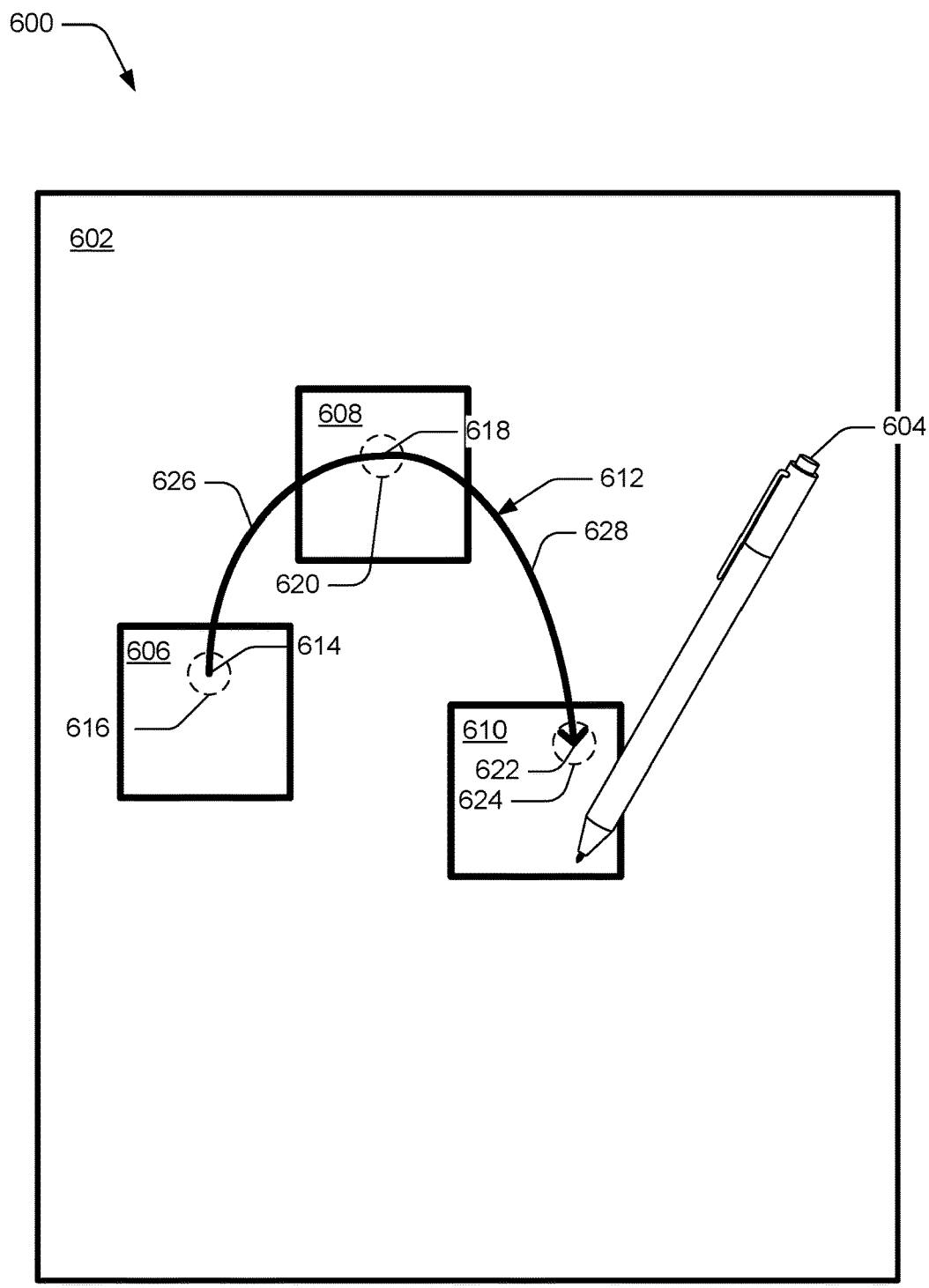
FIGS. 6A and 6B illustrate an example of ink anchoring for three or more objects in accordance with one or more implementations.
Figure 6B:
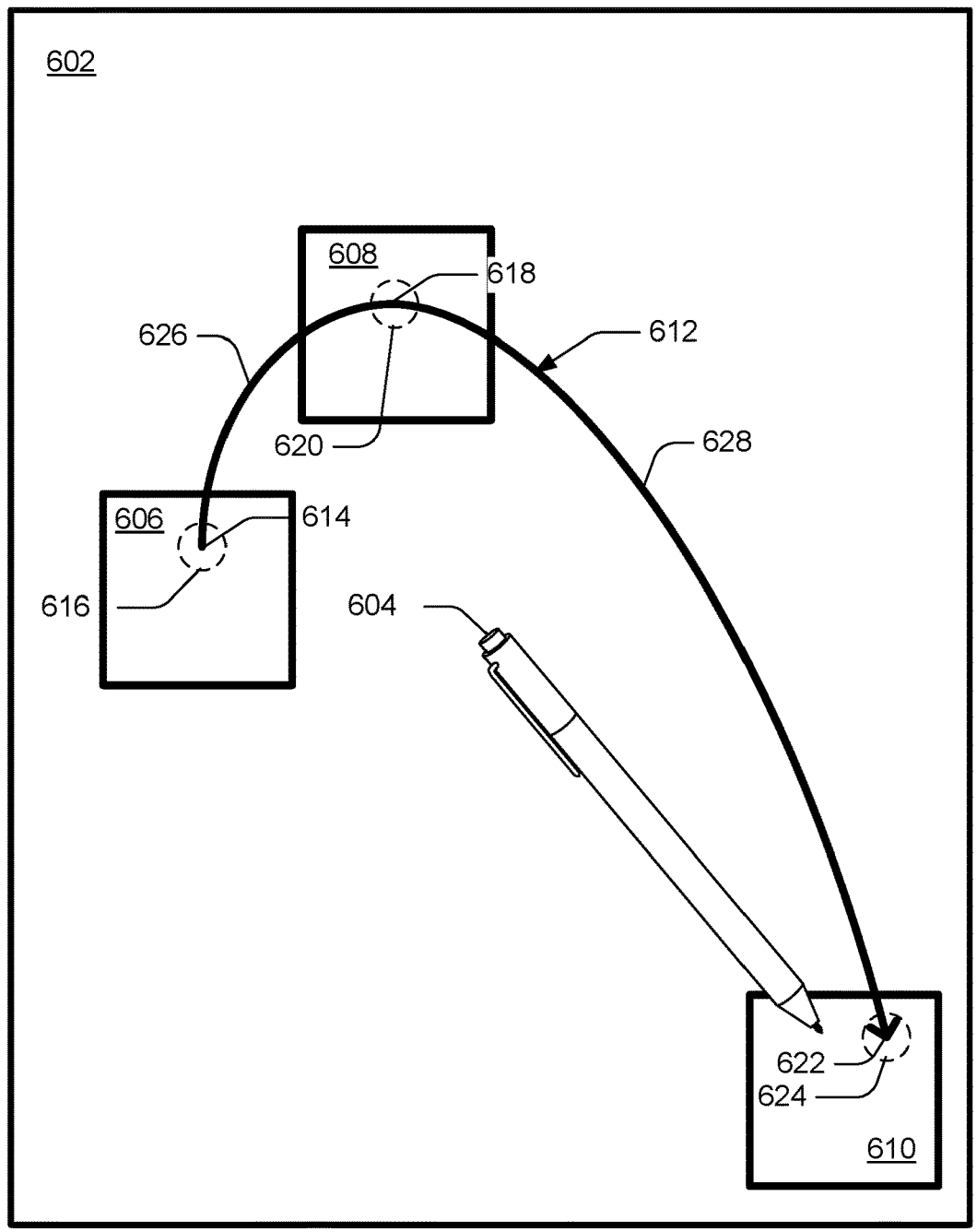

As an example, consider FIGS. 6A and 6B, which illustrate an example 600 of ink anchoring for three or more objects in accordance with one or more implementations.

In FIG. 6A, client device 102 displays an interactive canvas 602 on one or more display devices. As described throughout, the interactive canvas 602 may be associated with a journal application and presented on display devices 104 and 106 of a "dual-display" client device 102. However, in other cases the interactive canvas 602 may be displayed on a "single-display" device and/or associated with a different type of application. The journal application enables the user to take notes and/or draw on the interactive canvas 602 using an input device, such as a stylus 604.

In this example, the interactive canvas 602 includes multiple objects, including a first object 606, a second object 608, and a third object 610. As described throughout, objects may include any type of content, such as images and photos, videos, audio files, text, symbols, drawings, and so forth.

Ink input is provided to interactive canvas 602 when the user draws a line with an arrow from first object 606, through second object 608, and ending at third object 610. The ink input is digitized and displayed on the interactive canvas 602 as an ink object 612.

In this case, ink anchoring module 134 determines that the ink object 612 overlaps three or more objects, which in this example includes the first object 606, the second object 608, and the third object 610.

The ink anchoring module 134 then determines anchor points on the ink object that are aligned with a corresponding anchor position within each of the three or more objects. For example, the ink anchoring module 134 determines a first anchor point 614 on the ink object 612 that is aligned with a first anchor position 616 on the first object 606. Similarly, the ink anchoring module 134 determines a second anchor point 618 on the ink object 612 that is aligned with a second anchor position 620 on the second object 608. Similarly, the ink anchoring module 134 determines a third anchor point 622 on the ink object 612 that is aligned with a third anchor position 624 on the third object 610. The ink anchoring module 134 can determine the anchor points in a variety of different ways, such as based on the a beginning or ending drawing stroke, the amount of ink within the object, and so forth.

Ink anchoring module 134 then anchors the anchor points on the ink object to the respective anchor positions within each of the three or more objects. For example, ink anchoring module 134 anchors the first anchor point 614 on the ink object 612 to the first anchor position 616 within the first object 606, anchors the second anchor point 618 on the ink object 612 to the second anchor position 620 within the second object 608, and anchors the third anchor point 612 on the ink object 612 to the third anchor position 624 within the third object 610

Next, the ink anchoring module 134 divides the ink object 612 into multiple segments such that each of the multiple segments overlaps two of the three or more objects. For example, in FIG. 6A, ink anchoring module 134 divides ink object 602 into a first segment 626 which overlaps both first object 606 and second object 608, and a second segment 628 which overlaps both second object 608 and third object 610.

Subsequently, in response to one of the three or more objects being manipulated, the ink anchoring module 134 adjusts a respective segment of the ink object which overlaps the manipulated object. For example, in FIG. 6B the user has manipulated third object 610 by moving the third object 610 to the bottom right hand corner of interactive canvas 602. To do so, the user has selected third object 610 using stylus 604, and dragged the third object 610 to the lower right corner of interactive canvas 602. In response to the manipulation of third object 610, ink anchoring module 134 adjusts the second segment 628 of ink object 612 which overlaps the manipulated third object 610. Doing so maintains alignment of the anchor points within the corresponding anchor positions within the respective two objects of the respective segment. For example, in FIG. 6B, ink anchoring module 134 has adjusted the second segment 628 by deforming the shape of the second segment 628 in order to maintain the alignment of anchor points 618 and 622 with corresponding anchor positions 620 and 624 within the respective second and third objects 608 and 610.

In one or more implementations, ink anchoring module 134 adjusts the respective segment of the ink object which overlaps the manipulated object without adjusting at least one of the multiple segments. For example, in FIG. 6B, ink anchoring module 134 adjusts second segment 628 without adjusting the first segment 626. Alternately, in some cases ink anchoring module may adjust the respective segment of the ink object a greater amount than an adjustment of at least one of the multiple segments.

In one or more implementations, an ink object may be linked to an object being transferred to another container, as well as objects that are not being transferred. In this case, the ink anchoring module may be configured to break a link between the ink object and either the objects being transferred to the new container or the objects remaining in the original container. Alternately, the ink anchoring module may be configured to maintain the link across container boundaries. In this instance, a robust reference system may be utilized to maintain links across containers.

The following discussion describes some example procedures in accordance with one or more implementations. The example procedures may be employed in the environment 100 of FIG. 1, the system 1000 of FIG. 10, and/or any other suitable environment. The procedures, for instance, represent example procedures for implementation of the scenarios described above. In at least some implementations, the steps described for the various procedures can be implemented automatically and independent of user interaction.

Figure 7:
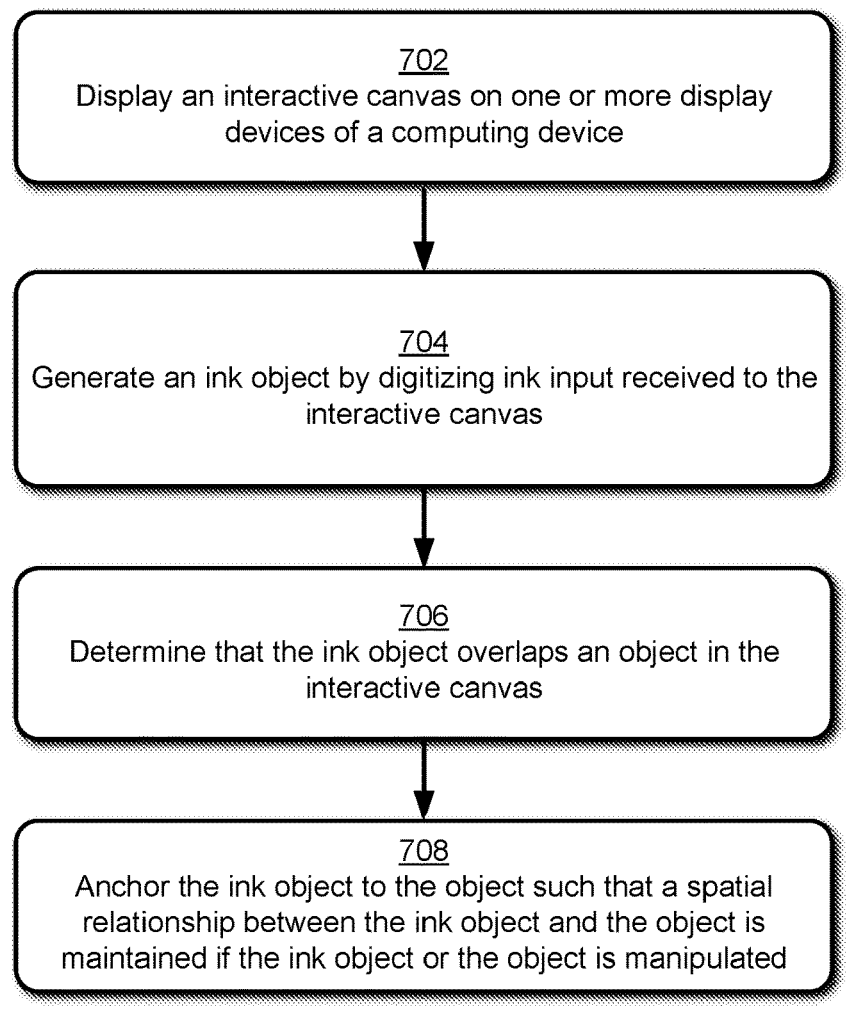
FIG. 7 is a flow diagram that describes steps in a method for ink anchoring in accordance with one or more implementations.

FIG. 7 is a flow diagram that describes steps in a method for ink anchoring in accordance with one or more implementations.

At 702, an interactive canvas is displayed on the one or more display devices of the computing device. For example, client device 102 displays an interactive canvas 302 on one or more displays.

At 704, ink object is generated by digitizing ink input received to the interactive canvas. For example, in FIG. 3B, ink input is provided to interactive canvas 302 when the user draws a picture of the sun on stylus 304. The ink input is digitized and displayed on the interactive canvas 302 as an ink object 308

At 706, it is determined that the ink object overlaps an object in the interactive canvas, and at 708, the ink object is anchored to the object such that a spatial relationship between the ink object and the object is maintained if the ink object or the object is manipulated. For example, ink anchoring module 134 determines that the ink object 308 overlaps the object 306, and thus anchors the ink object 308 to the object 306 such that the spatial relationship between the ink object 306 and the object 308 is maintained if either the ink object or object are manipulated, such as by moving or resizing the ink object or object.

Figure 8:
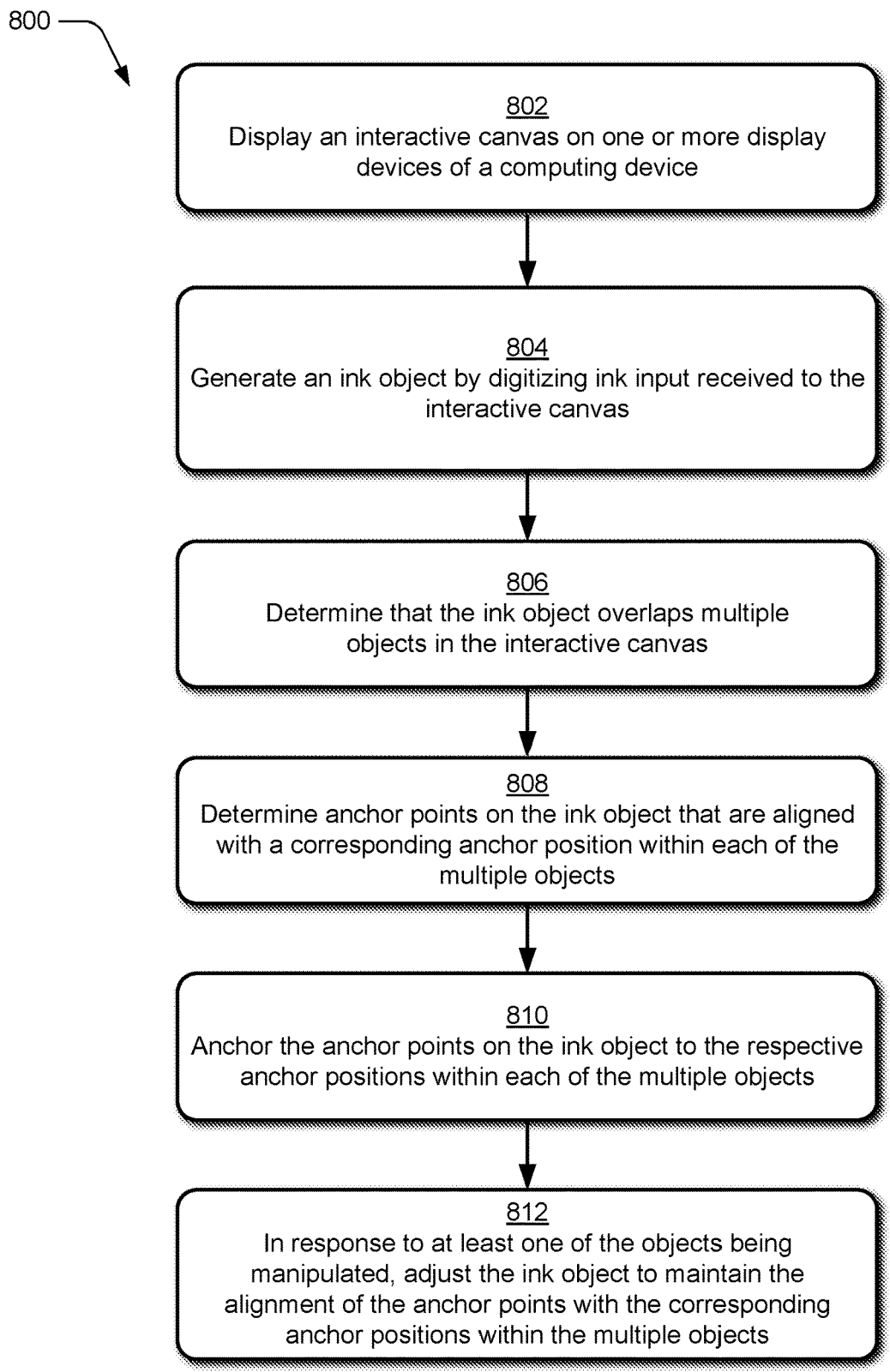
FIG. 8 is a flow diagram that describes steps in an additional method for ink anchoring in accordance with one or more implementations.

FIG. 8 is a flow diagram that describes steps in an additional method for ink anchoring in accordance with one or more implementations.

At 802, an interactive canvas is displayed on the one or more display devices of the computing device. For example, client device 102 displays an interactive canvas 502 on one or more displays.

At 804, an ink object is generated by digitizing ink input received to the interactive canvas. For example, ink input is provided to interactive canvas 502 when the user draws a line with an arrow from object 506 to object 508. The ink input is digitized and displayed on the interactive canvas 502 as an ink object 510.

At 806, it is determined that the ink object overlaps multiple objects in the interactive canvas. For example, the ink anchoring module 134 determines that the ink object 510 overlaps both the first object 506 and the second object 508.

At 808, anchor points on the ink object that are aligned with a corresponding anchor position within each of the multiple objects are determined. For example, the ink anchoring module 134 determines a first anchor point 512 on the ink object 510 that is aligned with a first anchor position 514 on the first object 506. Similarly, the ink anchoring module 134 determines a second anchor point 516 on the ink object 510 that is aligned with a second anchor position 518 on the second object 508. The ink anchoring module 134 can determine the anchor points in a variety of different ways, such as based on the a beginning or ending drawing stroke, the amount of ink within the object, and so forth.

At 810, the anchor points on the ink object are anchored to the respective anchor positions within each of the multiple objects. For example, ink anchoring module 134 anchors the first anchor point 512 on the ink object 510 to the first anchor position 514 within the first object 506 and anchors the second anchor point 516 on the ink object 510 to the second anchor position 518 within the second object 508.

At 812, in response to at least one of the multiple objects being manipulated, the ink object is adjusted to maintain the alignment of the anchor points with the corresponding anchor positions within the multiple objects. For example, in FIG. 5B the user has manipulated second object 508 by moving the second object 508 to the upper right hand corner of interactive canvas 502. To do so, the user has selected object 508 using stylus 504, and dragged the second object 508 to the upper right corner of interactive canvas 502. In response to the manipulation of object 508, ink anchoring module 134 adjusts the ink object 510 in order to maintain the alignment of the first and second anchor points 512 and 516 on ink object 510 with the corresponding first and second anchor positions 514 and 518 within objects 506 and 508, respectively. For example, as depicted in FIG. 5B, the ink anchoring module 134 has deformed the shape of the ink object 510 in order to maintain the alignment of anchor points 512 and 516 with anchor positions 514 and 518.

Figure 9:
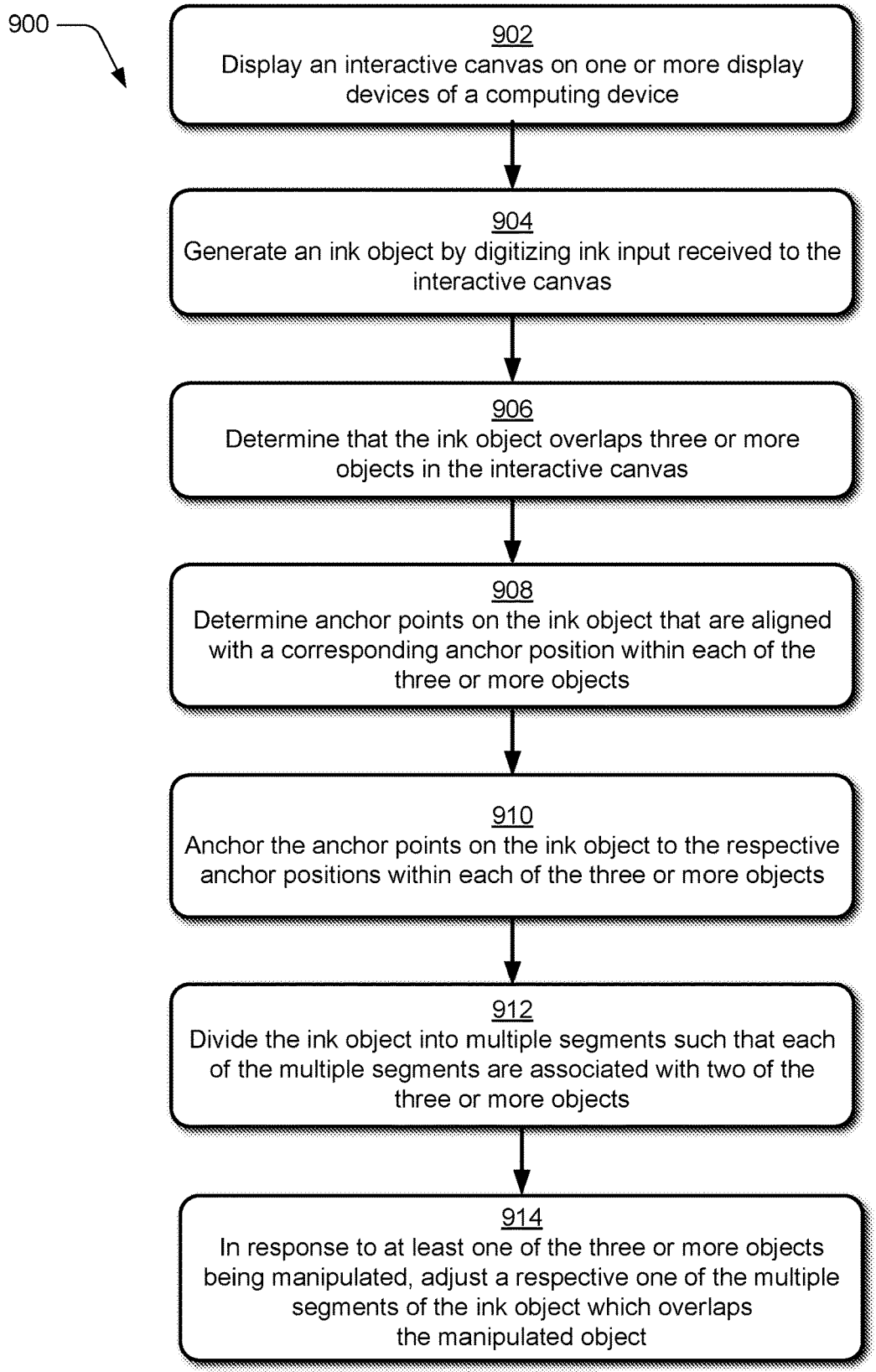
FIG. 9 is a flow diagram that describes steps in an additional method for ink anchoring in accordance with one or more implementations.

FIG. 9 is a flow diagram that describes steps in an additional method for ink anchoring in accordance with one or more implementations.

At 902, an interactive canvas is displayed on the one or more display devices of a computing device. For example, client device 102 displays an interactive canvas 602 on one or display devices.

At 904, an ink object is generated by digitizing ink input received to the interactive canvas. For example, ink input is provided to interactive canvas 602 when the user draws a line with an arrow from a first object 606, through a second object 608, and ending at a third object 610. The ink input is digitized and displayed on the interactive canvas 602 as an ink object 612.

At 906, it is determined that the ink object overlaps three or more objects in the interactive canvas. For example, the ink anchoring module 134 determines that the ink object 612 overlaps the first object 606, the second object 608, and the third object 610.

At 908, anchor points on the ink object that are aligned with a corresponding anchor position within each of the three or more objects are determined. For example, the ink anchoring module 134 determines a first anchor point 614 on the ink object 612 that is aligned with a first anchor position 616 on the first object 606. Similarly, the ink anchoring module 134 determines a second anchor point 618 on the ink object 612 that is aligned with a second anchor position 620 on the second object 608. Similarly, the ink anchoring module 134 determines a third anchor point 622 on the ink object 612 that is aligned with a third anchor position 624 on the third object 610. The ink anchoring module 134 can determine the anchor points in a variety of different ways, such as based on the a beginning or ending drawing stroke, the amount of ink within the object, and so forth.

At 910, the anchor points on the ink object are anchored to the respective anchor positions within each of the three or more objects. For example, ink anchoring module 134 anchors the first anchor point 614 on the ink object 612 to the first anchor position 616 within the first object 606, anchors the second anchor point 618 on the ink object 612 to the second anchor position 620 within the second object 608, and anchors the third anchor point 612 on the ink object 612 to the third anchor position 624 within the third object 610

At 912, the ink object is divided into multiple segments such that each of the multiple segments are associated with two of the three or more objects. For example, ink anchoring module 134 divides ink object 602 into a first segment 626 which overlaps both first object 606 and second object 608, and a second segment 628 which overlaps both second object 608 and third object 610.

At 914, in response to at least one of the three or more objects being manipulated, a respective one of the multiple segments of the ink object which overlaps the manipulated object is adjusted. For example, as illustrated in FIG. 6B the user has manipulated third object 610 by moving the third object 610 to the bottom right hand corner of interactive canvas 602. To do so, the user has selected third object 610 using stylus 604, and dragged the third object 610 to the lower right corner of interactive canvas 602. In response to the manipulation of third object 610, ink anchoring module 134 adjusts the second segment 628 of ink object 612 which overlaps the manipulated third object 610. Doing so maintains alignment of the anchor points within the corresponding anchor positions within the respective two objects of the respective segment. For example, in FIG. 6B, ink anchoring module 134 has adjusted the second segment 628 by deforming the shape of the second segment 628 in order to maintain the alignment of anchor points 618 and 622 with corresponding anchor positions 620 and 624 within the respective second and third objects 608 and 610.

In one or more implementations, ink anchoring module 134 adjusts the respective segment of the ink object which overlaps the manipulated object without adjusting at least one of the multiple segments. For example, as illustrated in FIG. 6B, ink anchoring module 134 adjusts second segment 628 without adjusting the first segment 626. Alternately, in some cases ink anchoring module may adjust the respective segment of the ink object a greater amount than an adjustment of at least one of the multiple segments.

Figure 10:
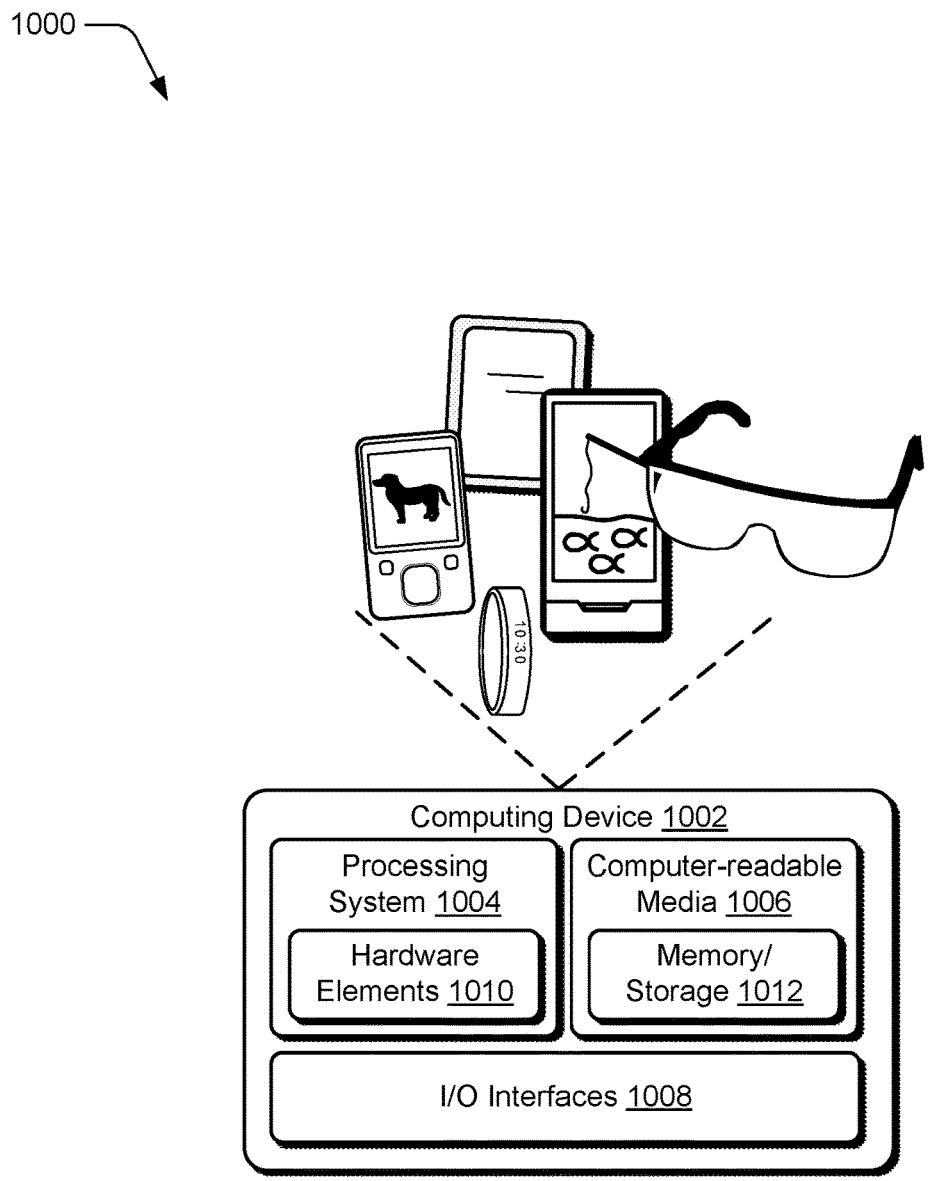
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. In at least some implementations, the computing device 1002 represents an implementation of the client device 102 discussed above, such as a dual-display device. The computing device 1002 may, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, a dual-surface gesture-input peripheral for a computing device, and so forth.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media and does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

Example implementations described herein include, but are not limited to, one or any combinations of one or more of the following examples:

In one or more examples, a computing device comprises: one or more display devices; at least one processor; and at least one computer-readable storage media storing instructions that are executable by the at least one processor to: display an interactive canvas on the one or more display devices of the computing device; generate an ink object by digitizing ink input received to the interactive canvas; determine that the ink object overlaps an object in the interactive canvas; and anchor the ink object to the object such that a spatial relationship between the ink object and the object is maintained if the ink object or the object is manipulated.

An example as described alone or in combination with any of the other examples described above or below, wherein the anchoring creates a non-destructive link between the ink object and the object such that the object is not permanently edited by the overlapping ink object.

An example as described alone or in combination with any of the other examples described above or below, wherein the non-destructive link can be removed by a user.

An example as described alone or in combination with any of the other examples described above or below, wherein the anchoring maintains separate object identifiers for the ink object and the object.

An example as described alone or in combination with any of the other examples described above or below, wherein the separate object identifiers enable the ink object and the object to be accessed or searched for individually.

An example as described alone or in combination with any of the other examples described above or below, wherein the instructions cause the at least one processor to anchor the ink object to the object based on the ink object being within close spatial proximity to the object without overlapping the object.

An example as described alone or in combination with any of the other examples described above or below, wherein the instructions cause the at least one processor to anchor the ink object to the object based on the ink object being within close spatial proximity and time proximity to the object without overlapping the object.

An example as described alone or in combination with any of the other examples described above or below, wherein the anchoring causes the ink object to move with the object in response to user input to move the object.

An example as described alone or in combination with any of the other examples described above or below, wherein the anchoring causes the ink object to be re-sized with the object in response to user input to re-size the object.

An example as described alone or in combination with any of the other examples described above or below, wherein the ink object comprises handwriting or drawing strokes.

An example as described alone or in combination with any of the other examples described above or below, wherein the one or more objects comprise one or more images, text, videos, or audio files.

An example as described alone or in combination with any of the other examples described above or below, wherein the computing device comprises a dual-display device comprising a first display device and a second display device.

An example as described alone or in combination with any of the other examples described above or below, wherein the interactive canvas is displayed on both the first and second display devices of the dual-display device.

An example as described alone or in combination with any of the other examples described above or below, wherein the interactive canvas is displayed as pages of a journal application.

In one or more examples, a method implemented by a computing device comprises: displaying an interactive canvas on the one or more display devices of the computing device; generating an ink object by digitizing ink input received to the interactive canvas; determining that the ink object overlaps an object in the interactive canvas; and anchoring the ink object to the object such that a spatial relationship between the ink object and the object is maintained if the ink object or the object is manipulated.

An example as described alone or in combination with any of the other examples described above or below, wherein the anchoring creates a non-destructive link between the ink object and the object such that the object is not permanently edited by the overlapping ink object.

An example as described alone or in combination with any of the other examples described above or below, wherein the non-destructive link can be removed by a user.

An example as described alone or in combination with any of the other examples described above or below, wherein the anchoring maintains separate object identifiers for the ink object and the object.

An example as described alone or in combination with any of the other examples described above or below, wherein the separate object identifiers enable the ink object and the object to be accessed or searched for individually.

An example as described alone or in combination with any of the other examples described above or below, wherein the instructions cause the at least one processor to anchor the ink object to the object based on the ink object being within close spatial proximity and time proximity to the object without overlapping the object.

In one or more examples, a method implemented by a computing device comprises: displaying an interactive canvas on one or more display devices of a computing device; generating an ink object by digitizing ink input received to the interactive canvas; determining that the ink object overlaps multiple objects in the interactive canvas; determining anchor points on the ink object that are aligned with a corresponding anchor position within each of the multiple objects; anchoring the anchor points on the ink object to the respective anchor positions within each of the multiple objects; and in response to at least one of the multiple objects being manipulated, adjusting the ink object to maintain the alignment of the anchor points with the corresponding anchor positions within the multiple objects.

An example as described alone or in combination with any of the other examples described above or below, wherein the adjusting comprises applying a geometric transform to the ink object to maintain the alignment of the anchor points with the corresponding anchor positions within the multiple objects.

An example as described alone or in combination with any of the other examples described above or below, wherein the adjusting deforms the ink object in order to maintain the alignment of the anchor points with the corresponding anchor positions within the multiple objects.

An example as described alone or in combination with any of the other examples described above or below, wherein the anchor positions correspond to an x,y location within each respective object.

An example as described alone or in combination with any of the other examples described above or below, wherein the ink input correspond to free-form ink input.

An example as described alone or in combination with any of the other examples described above or below, wherein the ink input correspond to free-form ink input wherein the manipulation comprises user input to move the at least one of the multiple objects.

An example as described alone or in combination with any of the other examples described above or below, wherein anchoring the anchor points on the ink object to the respective anchor positions within each of the multiple object creates a non-destructive link between the ink object and the multiple objects such that the multiple objects are not permanently edited by the overlapping ink object.

An example as described alone or in combination with any of the other examples described above or below, wherein the non-destructive link can be removed by a user.

An example as described alone or in combination with any of the other examples described above or below, wherein the non-destructive link is created by maintaining separate object identifiers for the ink object and each of the multiple objects.

An example as described alone or in combination with any of the other examples described above or below, wherein the separate object identifiers enable the ink object and each of the multiple objects to be accessed or searched for individually.

An example as described alone or in combination with any of the other examples described above or below, wherein the separate object identifiers include an ink object identifier which identifies the ink object and object identifiers which identify each of the multiple objects, wherein the ink object identifier includes links to each of the multiple objects, and wherein each object identifier includes a link to the ink object.

An example as described alone or in combination with any of the other examples described above or below, wherein the ink object identifier provides default positioning information about the ink object which can be understood by different types of applications or devices to improve compatibility with the different applications or devices.

An example as described alone or in combination with any of the other examples described above or below, further comprising associating the anchor points of the ink object with the ink object identifier and associating the anchor positions of each of the multiple objects with the respective object identifiers.

An example as described alone or in combination with any of the other examples described above or below, wherein it is determined that the ink object overlaps multiple objects based on the ink object being within close spatial proximity to the at least one of the multiple objects without overlapping the object.

An example as described alone or in combination with any of the other examples described above or below, wherein it is determined that the ink object overlaps multiple objects based on the ink object being within close spatial proximity and time proximity to at least one of the multiple objects without overlapping the object.

In one or more examples, a computing device comprises: one or more display devices; at least one processor; and at least one computer-readable storage media storing instructions that are executable by the at least one processor to: display an interactive canvas on the one or more display devices of the computing device; generate an ink object by digitizing ink input received to the interactive canvas; determine that the ink object overlaps three or more objects in the interactive canvas; determine anchor points on the ink object that are aligned with a corresponding anchor position within each of the three or more objects; anchor the anchor points on the ink object to the respective anchor positions within each of the three or more objects; divide the object into multiple segments such that each of the multiple segments overlaps two of the three or more objects; and in response to at least one of the three or more objects being manipulated, adjust a respective one of the multiple segments of the ink object which overlaps the manipulated object.

An example as described alone or in combination with any of the other examples described above or below, further comprising instructions that are executable by the at least one processor to adjust the respective segment of the ink object which overlaps the manipulated object without adjusting at least one of the multiple segments.

An example as described alone or in combination with any of the other examples described above or below, further comprising instructions that are executable by the at least one processor to adjust the respective segment of the ink object a greater amount than an adjustment of at least one of the multiple segments.

An example as described alone or in combination with any of the other examples described above or below, wherein the adjusting comprises applying a geometric transform to the respective segment of the ink object to maintain the alignment of the anchor points with the corresponding anchor positions within the respective two objects of the respective segment.

An example as described alone or in combination with any of the other examples described above or below, wherein the adjusting deforms the respective segment of the ink object in order to maintain the alignment of the anchor points with the corresponding anchor positions within the respective two objects of the respective segment.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a computing device, the method comprising:
    displaying an interactive canvas on one or more display devices of a computing device;
    generating an ink object by digitizing ink input received to the interactive canvas;
    determining that the ink object overlaps multiple objects in the interactive canvas, the ink object comprising overlapping portions, the overlapping portions being portions of the ink object that overlap an object in the interactive canvas, each object of the multiple objects having at least one corresponding overlapping portion of the ink object, wherein at least one of the overlapping portions of the ink object overlaps and passes entirely through one of the multiple objects;
    determining anchor points on the ink object that are aligned with a corresponding anchor position within each of the multiple objects by:
        identifying, for each of the overlapping portions of the ink object, an anchor point on the ink object for that overlapping portion; and
        determining, for each anchor point on the ink object, a corresponding position within the object that overlapping portion overlaps, wherein the corresponding position is an arbitrary point within the object for which the anchor point on the ink object corresponds in a coordinate space of the interactive canvas, the corresponding position being one of the anchor positions;
    anchoring the anchor points on the ink object to the respective anchor positions within each of the multiple objects; and
    in response to at least one of the multiple objects being manipulated, adjusting the ink object to maintain the alignment of the anchor points with the corresponding anchor positions within the multiple objects.

2. The method of claim 1, wherein the adjusting comprises applying a geometric transform to the ink object to maintain the alignment of the anchor points with the corresponding anchor positions within the multiple objects.

3. The method of claim 1, wherein the adjusting deforms the ink object in order to maintain the alignment of the anchor points with the corresponding anchor positions within the multiple objects.

4. The method of claim 1, wherein the ink input corresponds to free-form ink input.

5. The method of claim 1, wherein the ink input corresponds to free-form ink input wherein the manipulation comprises user input to move the at least one of the multiple objects.

6. The method of claim 1, wherein anchoring the anchor points on the ink object to the respective anchor positions within each of the multiple object creates a non-destructive link between the ink object and the multiple objects such that the multiple objects are not permanently edited by the overlapping ink object.

7. The method of claim 6, wherein the non-destructive link can be removed by a user.

8. The method of claim 6, wherein the non-destructive link is created by maintaining separate object identifiers for the ink object and each of the multiple objects.

9. The method of claim 8, wherein the separate object identifiers enable the ink object and each of the multiple objects to be accessed or searched for individually.

10. The method of claim 8, wherein the separate object identifiers include an ink object identifier which identifies the ink object and object identifiers which identify each of the multiple objects, wherein the ink object identifier includes links to each of the multiple objects, and wherein each object identifier includes a link to the ink object.

11. The method of claim 10, wherein the ink object identifier provides default positioning information about the ink object which can be understood by different types of applications or devices to improve compatibility with the different types of applications or devices.

12. The method of claim 10, further comprising associating the anchor points of the ink object with the ink object identifier and associating the anchor positions of each of the multiple objects with the respective object identifiers.

13. The method of claim 1, wherein it is determined that the ink object overlaps multiple objects based on the ink object being within close spatial proximity to the at least one of the multiple objects without overlapping the object.

14. The method of claim 1, wherein it is determined that the ink object overlaps multiple objects based on the ink object being within close spatial proximity and time proximity to at least one of the multiple objects without overlapping the object.

15. A computing device comprising:
one or more display devices;
at least one processor; and
at least one computer-readable storage media storing instructions that are executable by the at least one processor to:
display an interactive canvas on the one or more display devices of the computing device;
generate an ink object by digitizing ink input received to the interactive canvas;
determine that the ink object overlaps three or more objects in the interactive canvas, the ink object comprising overlapping portions, the overlapping portions being portions of the ink object that overlap an object in the interactive canvas, each object of the three or more objects having at least one corresponding overlapping portion of the ink object, wherein at least one of the overlapping portions of the ink object overlaps and passes entirely through one of the three or more objects;
determine anchor points on the ink object that are aligned with a corresponding anchor position within each of the three or more objects by:
identifying, for each of the overlapping portions of the ink object, an anchor point on the ink object for that overlapping portion; and
determining, for each anchor point on the ink object, a corresponding position within the object that overlapping portion overlaps, wherein the corresponding position is an arbitrary point within the object for which the anchor point on the ink object corresponds in a coordinate space of the interactive canvas, the corresponding position being one of the anchor positions;
anchor the anchor points on the ink object to the respective anchor positions within each of the three or more objects;
divide the ink object into multiple segments such that each of the multiple segments overlaps two of the three or more objects; and
in response to at least one of the three or more objects being manipulated, adjust a respective one of the multiple segments of the ink object which overlaps the manipulated object.

16. The computing device of claim 15, further comprising instructions that are executable by the at least one processor to adjust the respective segment of the ink object which overlaps the manipulated object without adjusting at least one of the multiple segments.

17. The computing device of claim 15, further comprising instructions that are executable by the at least one processor to adjust the respective segment of the ink object a greater amount than an adjustment of at least one of the multiple segments.

18. The computing device of claim 15, wherein the adjusting comprises applying a geometric transform to the respective segment of the ink object to maintain the alignment of the anchor points with the corresponding anchor positions within the respective two objects of the respective segment.

19. The computing device of claim 15, wherein the adjusting deforms the respective segment of the ink object in order to maintain the alignment of the anchor points with the corresponding anchor positions within the respective two objects of the respective segment.

20. The method of claim 1, wherein the arbitrary point is an off-center point within the object.

* * * * *